(12) United States Patent
Kubo et al.

(10) Patent No.: US 11,180,950 B2
(45) Date of Patent: Nov. 23, 2021

(54) ELECTROCHROMIC DEVICE, OPTICAL FILTER, LENS UNIT, IMAGING APPARATUS, WINDOW MEMBER, AND DRIVING METHOD

(71) Applicant: CANON KABUSHIKI KAISHA, Tokyo (JP)

(72) Inventors: Wataru Kubo, Inagi (JP); Kenji Yamada, Yokohama (JP); Satoshi Igawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 16/253,912

(22) Filed: Jan. 22, 2019

(65) Prior Publication Data
US 2019/0171077 A1 Jun. 6, 2019

Related U.S. Application Data

(63) Continuation of application No. PCT/JP2017/026393, filed on Jul. 21, 2017.

(30) Foreign Application Priority Data

Jul. 23, 2016 (JP) .............................. JP2016-144986

(51) Int. Cl.
| | | |
|---|---|---|
| *G02F 1/15* | (2019.01) | |
| *E06B 9/24* | (2006.01) | |
| *G02F 1/1503* | (2019.01) | |
| *G02F 1/163* | (2006.01) | |
| *E06B 3/67* | (2006.01) | |
| *G03B 11/00* | (2021.01) | |
| *G02F 1/155* | (2006.01) | |

(Continued)

(52) U.S. Cl.
CPC .............. *E06B 9/24* (2013.01); *E06B 3/6722* (2013.01); *G02F 1/1503* (2019.01); *G02F 1/155* (2013.01); *G02F 1/1514* (2019.01); *G02F 1/163* (2013.01); *G03B 11/00* (2013.01); *E06B 2009/2464* (2013.01); *G02F 1/15165* (2019.01)

(58) Field of Classification Search
CPC .. E06B 9/24; E06B 3/6722; E06B 2009/2464; G02F 1/1503; G02F 1/1514; G02F 1/155; G02F 1/163; G02F 1/15165; G03B 11/00
USPC .................................................. 359/265-275
See application file for complete search history.

(56) References Cited

FOREIGN PATENT DOCUMENTS

| JP | 2-287515 A | 11/1990 |
|---|---|---|
| JP | 03-059545 A | 3/1991 |

(Continued)

*Primary Examiner* — William Choi
(74) *Attorney, Agent, or Firm* — Canon U.S.A., Inc., IP Division

(57) ABSTRACT

An electrochromic device according to the present disclosure includes an electrochromic element that includes a first electrode, a second electrode, and an electrochromic layer disposed between the first electrode and the second electrode. The electrochromic layer contains an anodic electrochromic compound and an oxidizable substance. The oxidizable substance is a substance which substantially does not undergo a color change due to oxidation and whose oxidant is not reduced. An oxidation reaction of the oxidizable substance is less likely to occur than an oxidation reaction of the anodic electrochromic compound. A controller is configured to control oxidation of the oxidizable substance based on a charge balance of the electrochromic element.

18 Claims, 8 Drawing Sheets

(51) Int. Cl.
    *G02F 1/1514*        (2019.01)
    *G02F 1/1516*        (2019.01)

(56) References Cited

FOREIGN PATENT DOCUMENTS

| | | | |
|---|---|---|---|
| JP | 4-72272 U | | 6/1992 |
| JP | 2007-171781 A | | 7/2007 |
| JP | 2007-286570 A | | 11/2007 |
| JP | 2007286570 A | * | 11/2007 |
| JP | 2012-83788 A | | 4/2012 |
| JP | 2015-129111 A | | 7/2015 |
| JP | 2015-166338 A | | 9/2015 |
| JP | 2016-95503 A | | 5/2016 |
| JP | 2017-146590 A | | 8/2017 |

* cited by examiner

ELECTROCHROMIC DEVICE, OPTICAL FILTER, LENS UNIT, IMAGING APPARATUS, WINDOW MEMBER, AND DRIVING METHOD

CROSS-REFERENCE TO RELATED APPLICATIONS

This application is a Continuation of International Patent Application No. PCT/JP2017/026393, filed Jul. 21, 2017, which claims the benefit of Japanese Patent Application No. 2016-144986, filed Jul. 23, 2016, both of which are hereby incorporated by reference herein in their entirety.

TECHNICAL FIELD

The present disclosure relates to an electrochromic device and an optical filter, a lens unit, an imaging apparatus, and a window member that use the electrochromic device, and a driving method for the electrochromic device.

BACKGROUND ART

Compounds having electrochromic characteristics (hereafter, "electrochromic" may be referred to as "EC") with which optical properties (absorption wavelength, absorbance) of a substance change through an electrochemical oxidation-reduction reaction are referred to as EC compounds. Electrochromic devices (EC devices) that use such an EC compound are applied to, for example, display apparatuses, variable-reflectivity mirrors, and variable transmission windows.

Among EC compounds, organic EC compounds can exhibit both transparency in a decolored state and high absorbance in a colored state, and furthermore the absorption wavelength can be changed in accordance with the molecular design.

In EC devices containing an organic EC compound, a change in optical properties over time needs to be suppressed. Specifically, even when the state of an EC device is changed from a colored state to a decolored state, a part of the organic EC compound is left in a colored state without being decolored, which decreases the transparency of the EC device in a decolored state. This may be caused by "charge imbalance" in which the balance of electron transfer is disturbed by, for example, deterioration of an organic EC compound contained in an EC layer.

PTL 1 discloses a complementary EC device in which an EC compound is dissolved in an electrolyte and which contains a material more easily oxidized than an anodic EC compound or a material more easily reduced than a cathodic EC compound. In the following description, these materials are referred to as "redox buffers".

In PTL 1, an oxidant or reductant of a redox buffer is more stable than an oxidant of an anodic EC compound serving as a colored body and a reductant of a cathodic EC compound serving as a colored body. Therefore, even if a charge imbalance is caused during the decoloring operation, the oxidant or reductant of the redox buffer is left compared with a colored body of the EC compound.

If a charge imbalance is caused in a complementary EC device, the ratio of a colored body of an anodic EC compound and a colored body of a cathodic EC compound in a colored state changes, which may inhibit achievement of an absorption spectrum in a colored state desired during design stages. In the method that uses a redox buffer in PTL 1, the residual coloring can be suppressed, but a charge imbalance between electrodes cannot be eliminated. Therefore, the ratio of a colored body of an anodic EC compound and a colored body of a cathodic EC compound in a colored state cannot be corrected.

CITATION LIST

Patent Literature

PTL 1 Japanese Patent Laid-Open No. 2012-83788

In view of the foregoing, the present disclosure provides an electrochromic device in which the residual coloring in a decolored state and the change in absorption spectrum in a colored state can be suppressed.

SUMMARY OF INVENTION

An electrochromic device according to the present disclosure includes an electrochromic element including a first electrode, a second electrode, and an electrochromic layer disposed between the first electrode and the second electrode; and a controller for the electrochromic element, wherein the electrochromic layer contains an anodic electrochromic compound and an oxidizable substance, the oxidizable substance is a substance which substantially does not undergo a color change due to oxidation and whose oxidant is not reduced, an oxidation reaction of the oxidizable substance is less likely to occur than an oxidation reaction of the anodic electrochromic compound, and the controller is configured to control oxidation of the oxidizable substance based on a charge balance of the electrochromic element.

Another electrochromic device according to the present disclosure includes an electrochromic element including a first electrode, a second electrode, and an electrochromic layer disposed between the first electrode and the second electrode; and a controller for the electrochromic element, wherein the electrochromic layer contains a cathodic electrochromic compound and a reducible substance, the reducible substance is a substance which substantially does not undergo a color change due to reduction and whose reductant is not oxidized, a reduction reaction of the reducible substance is less likely to occur than a reversible reduction reaction of the cathodic electrochromic compound, and the controller is configured to control reduction of the reducible substance based on a charge balance of the electrochromic element.

Further features of the present invention will become apparent from the following description of exemplary embodiments with reference to the attached drawings.

DESCRIPTION OF EMBODIMENTS

Figure 1A:
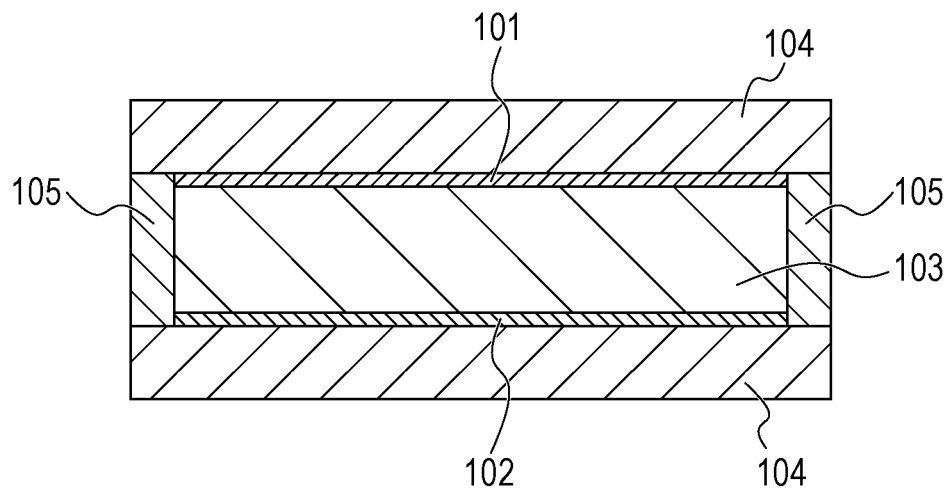
FIG. 1A schematically illustrates the structure of an electrochromic element according to a first embodiment.

In the present disclosure, an electrochromic device includes an electrochromic element (hereafter referred to as an "EC element") that includes a pair of electrodes and an electrochromic layer (hereafter referred to as an "EC layer") disposed between the pair of electrodes. The EC layer contains an EC compound and at least one of an oxidizable substance and a reducible substance that satisfy particular conditions.

The "electrochromic compound (hereafter referred to as an "EC compound")" in this specification is one of oxidation-reduction substances. Among the oxidation-reduction substances, the electrochromic compound is a compound whose optical properties such as absorption wavelength and absorbance changes through an oxidation-reduction reaction. EC compounds which lose electrons through an oxidation reaction and thus whose state changes from a light transmission state to a light absorption state in an optical wavelength range used in EC elements are referred to as "anodic electrochromic compounds". EC compounds which receive electrons through a reduction reaction and thus whose state changes from a light transmission state to a light absorption state in an optical wavelength range used in EC elements are referred to as "cathodic electrochromic compounds".

Herein, the "oxidation-reduction substance" in this specification is a compound that is reversibly subjected to an electrochemical oxidation-reduction reaction in a particular potential range. The oxidation-reduction substance may be either an inorganic compound or an organic compound, but is preferably an organic oxidation-reduction substance from the viewpoint of suitability with the operating environment of EC elements.

The EC layer of the EC element according to each embodiment below contains, in addition to an oxidation-reduction substance containing at least one EC compound, at least one of an oxidizable substance and a reducible substance. The oxidizable substance is a compound that is irreversibly subjected to an oxidation reaction in a particular potential range. The reducible substance is a compound that is irreversibly subjected to a reduction reaction in a particular potential range. The oxidizable substance and the reducible substance may be either inorganic compounds or organic compounds, but are preferably organic compounds from the viewpoint of suitability with the operating environment of EC elements.

For example, in the case of the oxidizable substance, the term "irreversibly" means that an oxidant obtained by the oxidation reaction of the oxidizable substance is not easily reduced to the original oxidizable substance compared with the EC compound contained in the EC layer. In the case of the reducible substance, a reductant obtained by the reduction reaction of the reducible substance is not easily oxidized to the original reducible substance compared with the EC compound contained in the EC layer.

The term "not easily" means that the number of repetitions of an oxidation-reduction reaction of each of the oxidizable substance and the reducible substance is ½ or less, preferably 1/10 or less, and more preferably 1/100 or less the number of repetitions of an oxidation-reduction reaction of the EC compound contained in the EC layer. In the initial state of normal EC elements, the oxidizable substance is in a reduction state and is contained in the EC layer while being possibly subjected to an irreversible oxidation reaction. Similarly, the reducible substance is in an oxidation state and is contained in the EC layer while being possibly subjected to an irreversible reduction reaction.

In the EC element according to each embodiment below, the EC layer contains at least one of an oxidizable substance and a reducible substance, and thus the residual coloring in a decolored state and the change in absorption spectrum in a colored state that are caused by charge imbalance can be suppressed. Specific examples and functions of the oxidizable substance and the reducible substance will be described in detail later.

Figure 2A:
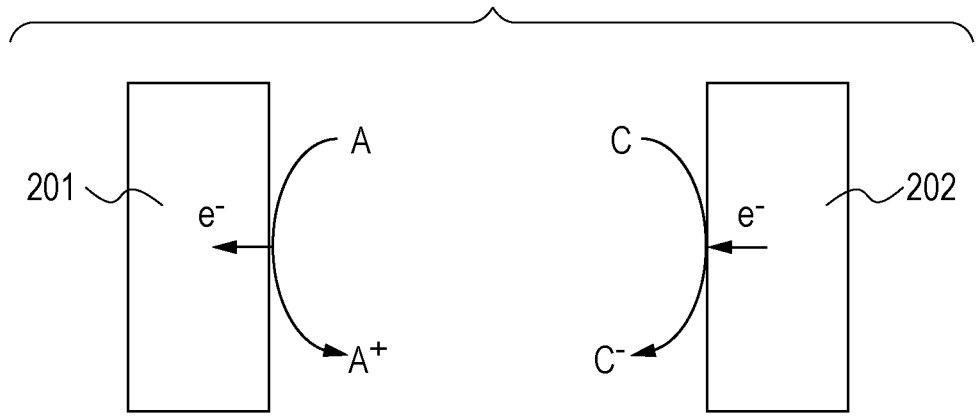
FIG. 2A illustrates a charge balance.
Figure 2B:
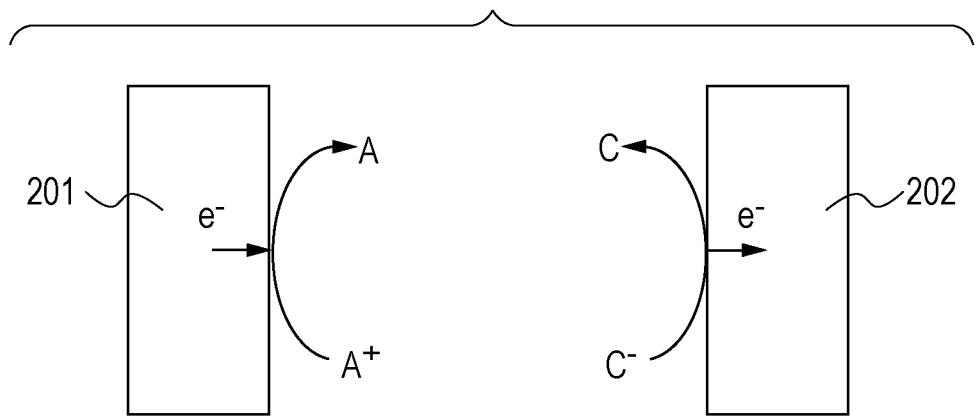
FIG. 2B illustrates a charge balance.
Figure 2C:
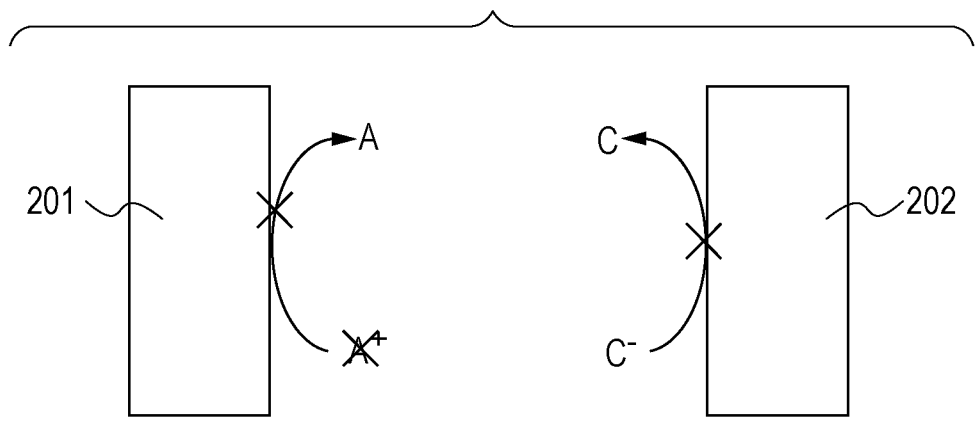
FIG. 2C illustrates a charge balance.

The charge imbalance will be described with reference to FIGS. 2A, 2B, and 2C. FIGS. 2A, 2B, and 2C are conceptual diagrams for describing a charge imbalance. In FIGS. 2A, 2B, and 2C, the case of a complementary EC element in which an anodic oxidation-reduction substance and a cathodic oxidation-reduction substance are used and at least one of these oxidation-reduction substances is an EC compound is taken as an example. Although a complementary EC element will be described herein, a charge imbalance may be caused even in an EC element containing only one of an anodic EC compound and a cathodic EC compound.

Each of the EC elements in FIGS. 2A, 2B, and 2C includes a first electrode 201 and a second electrode 202. An EC layer containing an anodic EC compound (A) and a cathodic EC compound (C) is disposed between the first electrode 201 and the second electrode 202. In the description below, the anodic EC compound (A) in a decolored state is referred to as a reductant of the anodic EC compound and the oxidized anodic EC compound (A$^+$) in a colored state is referred to as an oxidant of the anodic EC compound. The cathodic EC compound (C) in a decolored state is referred to as an oxidant of the cathodic EC compound and the reduced cathodic EC compound (C$^-$) in a colored state is referred to as a reductant of the cathodic EC compound.

FIG. 2A illustrates a coloring process through which the EC element is caused to have a colored state. When a coloring voltage is applied between the first electrode 201 serving as an anode electrode and the second electrode 202 serving as a cathode electrode (coloring driving), an oxidation reaction of the anodic EC compound (A) represented by formula (1) proceeds at the first electrode 201. A reduction reaction of the cathodic EC compound (C) represented by formula (2) proceeds at the second electrode 202. Through the progress of the reactions in the formula (1) and the formula (2), the EC element is caused to have a colored state.

$$A \rightarrow A^+ + e^- \quad (1)$$

$$C + e^- \rightarrow C^- \quad (2)$$

FIG. 2B illustrates a decoloring process that is opposite to the coloring process. When the EC element is caused to have a decolored state, a decoloring voltage is applied between the first electrode 201 and the second electrode 202 (decoloring driving). The decoloring driving is performed by, for example, short-circuiting the first electrode 201 and the second electrode 202. In the decoloring driving, reverse reactions in the formula (1) and the formula (2) proceed as illustrated in FIG. 2B. That is, at the first electrode 201, a reductant A is provided through the reduction reaction of an oxidant ($A^+$) of the anodic EC compound. At the second electrode 202, an oxidant C is provided through the oxidation reaction of a reductant ($C^-$) of the cathodic EC compound. Through these reactions, the EC compound in a colored state returns to a decolored state.

When the reactions illustrated in FIGS. 2A and 2B are properly caused in a repeated manner, the EC element is properly colored and decolored in a repeated manner without causing a charge imbalance of the EC element.

However, the driving of the EC element may cause a process other than the coloring and decoloring processes, which disturbs the charge balance. For example, the case where the oxidant ($A^+$) of the anodic EC compound is deteriorated will be described with reference to FIG. 2C.

If the oxidant ($A^+$) of the anodic EC compound that has been colored through the reaction represented by the formula (1) is deteriorated, the deteriorated oxidant is not reduced at the first electrode 201. Therefore, in the decoloring process, the reductant ($C^-$) of the cathodic EC compound loses its receiver of electrons to be released during the oxidation reaction. As a result, the reductant ($C^-$) of the cathodic EC compound is not oxidized and is left in a colored state, which causes residual coloring due to the reductant ($C^-$) that is left even after the decoloring driving. This disturbance of the charge balance as a result of improper transfer of electrons between the first electrode 201 and the second electrode 202 is referred to as a "charge imbalance".

The charge imbalance is caused by, for example, an irreversible electron transfer reaction (e.g., electrode reaction) of a substrate that affects the oxidation-reduction reaction of each compound contained in the EC layer. Specifically, the charge imbalance is caused by, for example, a chemical reaction with an EC compound contained in the EC layer or impurities derived from environmental impurities (e.g., oxygen and water) and sealants or a chemical reaction of radical species.

The reduction or elimination of the above charge imbalance by controlling the charge balance between the first electrode 201 and the second electrode 202 is called "charge rebalance".

Hereafter, embodiments of the present invention will be described. The present invention is not limited to the embodiments below and modifications can be made within the scope of the invention.

First Embodiment

Configuration of EC Device

Figure 5:
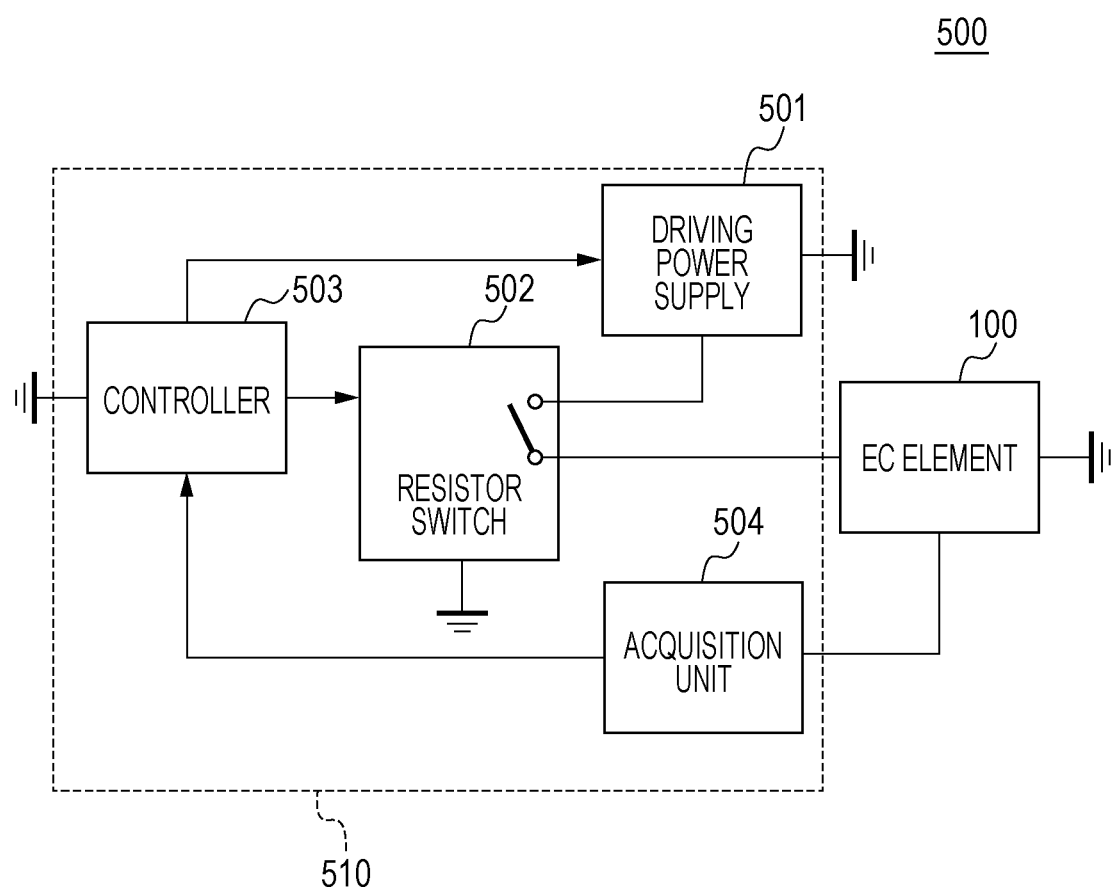
FIG. 5 schematically illustrates the configuration of the electrochromic device according to the first embodiment.

The configuration of an electrochromic (hereafter, "electrochromic" may be referred to as "EC") device 500 according to this embodiment will be described. FIG. 5 schematically illustrates the configuration of an EC device 500. The EC device 500 according to this embodiment includes an EC element 100 and a driving unit 510.

The configuration of an EC device is not limited to the configuration according to this embodiment. It is sufficient that the EC device includes an EC element including at least a first electrode, a second electrode, and an EC layer disposed between the first electrode and the second electrode.

Structure of EC Element

Figure 1B:
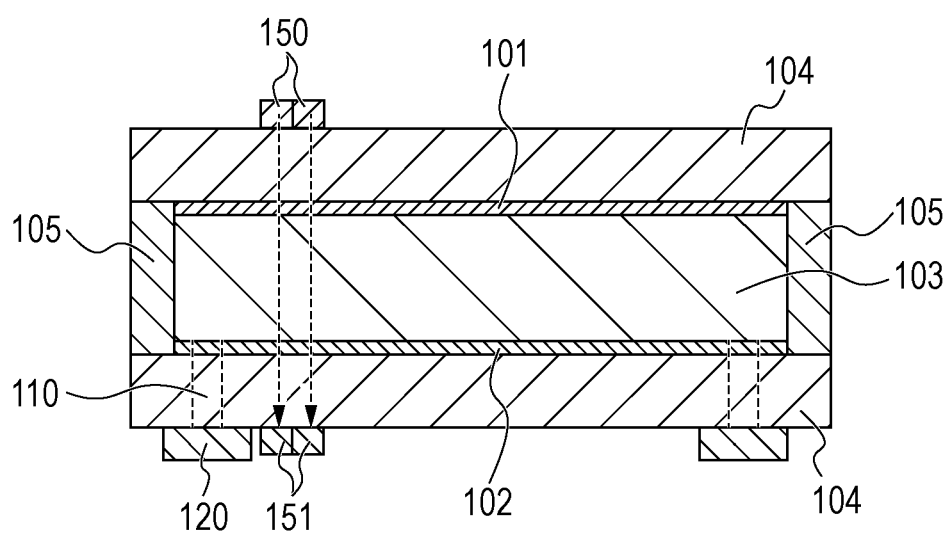
FIG. 1B schematically illustrates the structure of the electrochromic element according to the first embodiment.

The structure of the EC element 100 will be described with reference to FIGS. 1A and 1B. FIGS. 1A and 1B schematically illustrate the structure of the EC element 100.

The EC element 100 includes a pair of substrates 104, a first electrode 101 and a second electrode 102 disposed between the pair of substrates 104, an EC layer 103 disposed between the first electrode 101 and the second electrode 102, and a sealing member 105. The EC layer 103 is preferably held while isolated from the outside by the sealing member 105. The structure of the EC element 100 is not limited to the structure according to this embodiment. For example, the EC element 100 does not necessarily include the pair of substrates 104 and the sealing member 105 as long as the EC element 100 includes at least the first electrode 101, the second electrode 102, and the EC layer 103 disposed between the first electrode 101 and the second electrode 102.

Herein, an example of the mechanism in which light passes through the EC element 100 will be described. In the case of a transmission EC element in which the first electrode 101 and the second electrode 102 face each other, the incident light passes through the first electrode 101 or the second electrode 102 and thus is introduced into the EC element 100. When the EC compound contained in the EC element 100 is in a colored state, at least part of the incident light is absorbed by the EC compound and the remaining light is emitted through the other electrode.

In the case where the EC element 100 is a reflection EC element in which the first electrode 101 and the second electrode 102 face each other, the incident light passes through the first electrode 101 or the second electrode 102 and enters the EC element 100. When the EC compound contained in the EC element 100 is in a colored state, at least part of the light is absorbed by the EC compound, reflected by a reflector, a scatterer, or the like, and emitted through the electrode through which the light has passed during incidence. The reflector, the scatterer, or the like is often disposed between the first electrode and the second electrode, but may be disposed outside an electrode opposite to the electrode through which the light passes during incidence. The mechanism in which light passes through the EC element 100 is not limited thereto, and can be appropriately changed in accordance with the applications.

Each constituent member of the EC element 100 will be described.

(1) Substrate

A conductive film used as the first electrode 101 or the second electrode 102 is disposed on the pair of substrates 104. The pair of substrates 104 are preferably transparent substrates and are formed of, for example, a glass such as a colorless glass, a colored glass, or a tempered glass, a transparent polymer compound, or a colorless or colored transparent resin. The "transparency" herein means that the transmittance of light that enters the EC element 100 is 50% or more and 100% or less, preferably 70% or more and 100% or less, and more preferably 90% or more and 100% or less.

The light that enters the EC element 100 is light in a wavelength range used in the EC element 100. For example, when the EC element 100 is used as an optical filter for imaging apparatuses in a visible range, the light that enters the EC element 100 is light in a visible range. When the EC element 100 is used as an optical filter for imaging apparatuses in an infrared range, the light that enters the EC element 100 is light in an infrared range.

Specific examples of the transparent resin used for the substrates 104 include polyethylene terephthalate, polyethylene naphthalate, polynorbornene, polyamide, polysulfone, polyethersulfone, polyether ether ketone, polyphenylene sulfide, polycarbonate, polyimide, and polymethyl methacrylate.

(2) First Electrode and Second Electrode

At least one of the first electrode 101 and the second electrode 102 is preferably a transparent electrode. The "transparency" herein means that the transmittance of light that enters the EC element 100 is 50% or more and 100% or less. When at least one of the first electrode 101 and the second electrode 102 is a transparent electrode, light can be efficiently introduced into the EC element 100 from the outside and can be interacted with molecules of the EC compound. Thus, the optical properties of the EC compound can be reflected on emission light.

The first electrode 101 and the second electrode 102 may each be, for example, a layer obtained by forming a transparent conductive oxide on the substrate 104, a conductive layer of dispersed carbon nanotube, or a transparent electrode obtained by partly forming a metal wire on the transparent substrate 104.

Examples of the transparent conductive oxide include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Among them, FTO or ITO is preferred.

The thickness of each of the first electrode 101 and the second electrode 102 is preferably 10 nm or more and 10000 nm or less. In particular, when the first electrode 101 and the second electrode 102 are formed of FTO or ITO so as to have a thickness of 10 nm or more and 10000 nm or less, both high transparency and chemical stability can be achieved.

When the first electrode 101 and the second electrode 102 each contain a transparent conductive oxide, each of the electrodes 101 and 102 may be a single-layer electrode layer formed of the transparent conductive oxide or a multilayer electrode layer formed by stacking sublayers of the transparent conductive oxide. When each of the first electrode 101 and the second electrode 102 is a multilayer electrode layer, the conductivity and the transparency can be improved.

When the transparent electrode obtained by partly forming a metal wire on the substrate 104 is used as the first electrode 101 or the second electrode 102, the material for the metal wire is not particularly limited, but is preferably an electrochemically stable metal material such as Ag, Au, Pt, or Ti. The metal wire is preferably formed in a grid pattern. The transparent electrode including the metal wire may be a planar electrode or may be a curved electrode if necessary.

For each of the first electrode 101 and the second electrode 102, a preferred electrode is selected in accordance with the applications of the EC element 100. For example, when the EC element 100 is used as a transmission EC element, the first electrode 101 and the second electrode 102 are preferably transparent electrodes. The first electrode 101 and the second electrode 102 are more preferably formed of a transparent conductive oxide. When the EC element 100 is used as a reflection EC element, one of the first electrode 101 and the second electrode 102 is preferably a transparent electrode and the other is preferably a light-reflecting electrode that reflects light that enters the EC element 100.

By forming a reflection layer or a scattering layer between the first electrode 101 and the second electrode 102, an opaque electrode or an electrode that absorbs light can be used as an electrode located behind the reflection layer or the scattering layer, which can improve the degree of freedom of the optical properties of the electrodes.

In any form, the first electrode 101 and the second electrode 102 are each preferably formed of a material that is stably present in an operating environment of the EC element 100 and that can immediately cause an oxidation-reduction reaction in response to the voltage application from the outside.

The distance (interelectrode distance) between the first electrode 101 and the second electrode 102 is preferably 1 µm or more and 500 µm or less. When the interelectrode distance is large, the EC layer 103 contains a sufficient amount of EC compound required to provide the features of the EC element 100. On the other hand, when the interelectrode distance is small, the response speed can be increased.

The EC element 100 according to this embodiment may optionally further include an electrode other than the first electrode 101 and the second electrode 102.

(3) Sealing Member

The sealing member 105 is preferably formed of a chemically stable material that is not easily permeated with gas and liquid and that does not inhibit the oxidation-reduction reaction of the EC compound. Examples of the material include inorganic materials such as glass frit, organic materials such as epoxy resin and acrylic resin, and metals. The sealing member 105 may have a function as a spacer that defines and holds the interelectrode distance between the first electrode 101 and the second electrode 102.

If the sealing member 105 does not have a function as a spacer, a spacer may be additionally disposed to keep the interelectrode distance. Examples of the material for the spacer used in this case include inorganic materials such as silica beads and glass fiber and organic materials such as polyimide, polytetrafluoroethylene, polydivinylbenzene, fluorine rubber, and epoxy resin.

(4) EC Layer

The EC layer 103 contains an electrolyte, one or more EC compounds, and at least one of an oxidizable substance and a reducible substance. The EC layer 103 may include a layer formed of the EC compound and a layer formed of the electrolyte. Alternatively, the EC layer 103 may be disposed in the form of a solution containing the EC compound and the electrolyte. In the EC element 100 according to this embodiment, the EC layer 103 may be a solution.

The EC element 100 is a complementary EC element including an EC layer 103 that contains at least one anodic oxidation-reduction substance and at least one cathodic oxidation-reduction substance.

The EC layer 103 is formed by, for example, a method described below. First, a pair of substrates 104 including a first electrode 101 and a second electrode 102 are bonded to a sealing member 105 such that the first electrode 101 and the second electrode 102 face each other at a particular distance to produce a cell. As illustrated in FIG. 1B, an opening 110 for injecting materials for the EC layer 103 into the cell is formed in the cell. Subsequently, the materials for the EC layer 103 are injected through the opening 110 by, for example, a vacuum injection method, an atmospheric injection method, or a meniscus method. Then, the opening 110 is sealed with a sealant 120 to provide an EC layer 103.

(4-1) Electrolyte

The electrolyte contained in the EC layer 103 is an electrolyte itself or an electrolytic solution prepared by dissolving an electrolyte in a solvent. Examples of the electrolyte include solutions prepared by dissolving a salt compound in a solvent, ionic liquids, gel electrolytes, and polymer electrolytes.

The solvent is selected in accordance with the applications in consideration of, for example, the solubility, vapor pressure, viscosity, and potential window of solutes such as an EC compound, an oxidizable substance, and a reducible substance. The solvent is preferably a polar solvent. Specific examples of the solvent include water and organic polar solvents such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone, and dioxolane.

Furthermore, the EC layer 103 may be a viscous solution or a gel prepared by adding a polymer or a gelling agent to the above solvent. Non-limiting examples of the polymer include polyacrylonitrile, carboxymethyl cellulose, poly(vinyl chloride), polyethylene oxide), poly(propylene oxide), polyurethane, polyacrylate, polymethacrylate, polyamide, polyacrylamide, polyester, and Nafion (registered trademark).

The salt compound is a salt that dissociates into ions and exhibits high solubility in a solvent and high compatibility with a solid electrolyte. The salt compound is not particularly limited as long as the salt compound is a stable substance at an operating potential of the EC element, and can be used by suitably combining cations and anions.

Examples of the cation include metal ions such as alkali metal ions and alkaline-earth metal ions and organic ions such as quaternary ammonium ions. Specific examples include Li, Na, K, Ca, Ba, tetramethylammonium, tetraethylammonium, and tetrabutylammonium. Examples of the anion include anions of fluorine compounds and halide ions. Specific examples thereof include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$.

By using an EC compound also serving as a salt compound, such an EC compound can serve as both an EC compound solution and an electrolytic solution. An example of the EC compound also serving as a salt compound is a viologen derivative.

(4-2) EC Compound

The EC compound used in this embodiment is an organic compound containing a low-molecular-weight organic compound and a high-molecular-weight organic compound.

The high-molecular-weight organic compound that can be used as an EC material is a high-molecular-weight compound containing a pyridinium salt and is specifically a viologen-based high-molecular-weight compound.

The EC compound according to this embodiment is preferably a low-molecular-weight organic compound that has a molecular weight of 2000 or less and changes from a decolored body to a colored body as a result of an oxidation reaction or a reduction reaction at the electrode.

In this embodiment, the anodic EC compound and the cathodic EC compound are contained as EC compounds, but it is sufficient that at least one of the anodic EC compound and the cathodic EC compound is contained. The EC layer 103 may contain one or more anodic EC compounds or one or more cathodic EC compounds.

Examples of the anodic EC compound include amines having an aromatic ring (e.g., phenazine derivatives and triallylamine derivatives), thiophene derivatives, pyrrole derivatives, thiazine derivatives, triallylmethane derivatives, bis(phenyl)methane derivatives, xanthene derivatives, fluoran derivatives, and spiropyran derivatives. Among them, low-molecular-weight thiophene derivatives (e.g., monothiophene derivatives, oligothiophene derivatives, and thienoacene derivatives) or low-molecular-weight amines having an aromatic ring (e.g., phenazine derivatives and triallylamine derivatives) are preferably used.

In a neutral state, the above-described anodic EC compound has an absorption peak in an ultraviolet range and no absorption peaks in a visible range and thus has a decolored state in which the transmittance in a visible range is high. The anodic EC compound changes into a radical cation through an oxidation reaction and the absorption peak shifts to the visible range, and thus a colored body is provided. The absorption wavelength of such a molecule can be designed by increasing or decreasing the π conjugation length or by changing the π conjugated system through a change in a substituent.

Examples of the cathodic EC compound include pyridine compounds such as viologen and quinone compounds.

The EC compound according to this embodiment is dissolved in an electrolyte. However, the EC element 100 may be any EC element as long as charges can be transferred between the electrodes during charge rebalance. Therefore, the EC compound does not necessarily diffuse through the electrolyte. For example, the EC compound may be immobilized onto each of the first electrode 101 and the second electrode 102.

Specifically, the EC compound is immobilized by a method in which the EC compound is bonded to an electrode material through a functional group contained in the EC compound, a method in which the EC compound is held in the form of a film by using electrostatic interactions or the like, or a method in which the EC compound is physically adsorbed onto the electrode. Among them, a method in which the EC compound is chemically bonded to a porous electrode through a functional group of the molecule of the EC compound or a method in which the EC compound is formed on an electrode is preferred from the viewpoint of achieving high response of the EC element 100. The EC compound is chemically bonded to a porous electrode through a functional group of the molecule by a method in which a low-molecular-weight organic compound serving as the EC compound is immobilized onto an electrode formed of fine particles of an oxide such as titanium oxide, zinc oxide, or tin oxide through a functional group such as a phosphate group or a carboxylate group. The EC compound is formed on an electrode by a method in which a viologen polymer is formed on a transparent electrode through polymerization.

As described above, the anodic EC compound changes into a colored body through a reversible first oxidation reaction and changes into a decolored body through a reduction reaction, which is a reverse reaction of the first oxidation reaction. The EC compound that has changed into a colored body through the first oxidation reaction may deteriorate through an irreversible second oxidation reaction. Similarly, the cathodic EC compound changes into a colored body through a reversible first reduction reaction and changes into a decolored body through an oxidation reaction, which is a reverse reaction of the first reduction reaction. The anodic EC compound that has changed to a colored body through the first reduction reaction may deteriorate through an irreversible second reduction reaction.

(4-3) Oxidizable Substance/Reducible Substance

The oxidizable substance is a substance in which an irreversible oxidation reaction electrochemically proceeds. The reducible substance is a substance in which an irreversible reduction reaction electrochemically proceeds. In the EC element 100, the residual coloring in a decolored state and a change in absorption spectrum in a colored state are suppressed by performing charge rebalance using an irreversible oxidation reaction of the oxidizable substance or an irreversible reduction reaction of the reducible substance.

The EC layer 103 contains at least one of an oxidizable substance in which an electrochemical oxidation reaction irreversibly proceeds and a reducible substance in which an electrochemical reduction reaction irreversibly proceeds. The oxidizable substance is a substance that is irreversibly oxidized when a particular voltage is applied to the EC layer 103 in a state (initial state) in which the EC layer 103 is transparent. The irreversibly oxidized substance, that is, an oxidant of the oxidizable substance is not easily reduced.

The reducible substance is a substance that is irreversibly reduced when a particular voltage is applied to the EC layer 103 in an initial state. As in the case of the oxidizable substance, a reductant of the reducible substance is not easily oxidized.

When the EC layer 103 contains an oxidizable substance, the irreversible oxidation reaction of the oxidizable substance is less likely to occur in terms of potential than the reversible first oxidation reaction through which the EC compound is caused to have a colored state. Furthermore, the irreversible oxidation reaction of the oxidizable substance according to this embodiment is more likely to occur in terms of potential than the irreversible second oxidation reaction that causes deterioration of the EC compound. The oxidizable substance according to this embodiment is preferably not colored when irreversibly oxidized.

When the EC layer 103 contains a reducible substance, the irreversible reduction reaction of the reducible substance according to this embodiment is less likely to occur in terms of potential than the reversible first reduction reaction through which the EC compound is caused to have a colored state. Furthermore, the irreversible reduction reaction of the reducible substance according to this embodiment is more likely to occur in terms of potential than the irreversible second reduction reaction that causes deterioration of the EC compound. The reducible substance according to this embodiment is preferably not colored when irreversibly reduced.

Specifically, the EC layer 103 according to this embodiment contains at least one of an oxidizable substance that satisfies the conditions (A) to (D) below and a reducible substance that satisfies the conditions (E) to (H) below.
(A) The oxidizable substance is irreversibly oxidized.
(B) The irreversible oxidation reaction is less likely to occur than the reversible oxidation reaction through which the anodic EC compound contained in the EC layer 103 is caused to have a colored state.
(C) The irreversible oxidation reaction is more likely to occur than the irreversible oxidation reaction of the anodic EC compound contained in the EC layer 103.
(D) When irreversibly oxidized, the oxidizable substance is not colored.
(E) The reducible substance is irreversibly reduced.
(F) The irreversible reduction reaction is less likely to occur than the reversible reduction reaction through which the cathodic EC compound contained in the EC layer 103 is caused to have a colored state.
(G) The irreversible reduction reaction is more likely to occur than the irreversible reduction reaction of the cathodic EC compound contained in the EC layer 103.
(H) When irreversibly reduced, the reducible substance is not colored.

Herein, the phrase "the oxidizable substance is not colored" is defined as follows: the maximum absorbance measured when the oxidizable substance is irreversibly oxidized is $1/10$ or less, preferably $1/100$ or less, and more preferably $1/1000$ or less the maximum absorbance in the most colored state of the EC element 100. Similarly, the phrase "the reducible substance is not colored" is defined as follows: the maximum absorbance measured when the reducible substance is irreversibly reduced is $1/10$ or less, preferably $1/100$ or less, and more preferably $1/1000$ or less the maximum absorbance in the most colored state of the EC element 100. The "maximum absorbance" refers to the highest absorbance in a wavelength range used in the EC element 100.

In other words, "not colored" means that the color substantially does not change.

When the conditions (B) and (C) are expressed in terms of oxidation-reduction potential, the oxidizable substance satisfies the following condition (i). When the conditions (F) and (G) are expressed in terms of oxidation-reduction potential, the reducible substance satisfies the following condition (ii).
(i) The potential VO1 at which the oxidizable substance is irreversibly oxidized is between the potential VA1 at which the anodic EC compound contained in the EC layer 103 is reversibly oxidized and the potential VA2 at which the anodic EC compound is irreversibly oxidized.
(ii) The potential VR1 at which the reducible substance is irreversibly reduced is between the potential VC1 at which the cathodic EC compound contained in the EC layer 103 is reversibly reduced and the potential VC2 at which the cathodic EC compound is irreversibly reduced.

Examples of the oxidizable substance that satisfies the conditions (A) to (D) or the reducible substance that satisfies the conditions (E) to (H) include nitrogen-containing compounds such as primary amine compounds, secondary amine compounds, tertiary amine compounds, aromatic amine compounds, and heterocyclic compounds containing a nitrogen atom. Examples of the heterocyclic compounds containing a nitrogen atom include pyridine derivatives.

In the anodic EC compound, a reversible oxidation reaction (hereafter referred to as a "third oxidation reaction") that is different from the first oxidation reaction may occur at a potential between the potential at which the reversible first oxidation reaction occurs and the potential at which the irreversible second oxidation reaction occurs. Since the third oxidation reaction is a reversible reaction, the potential VO1 may be a potential at which the first oxidation reaction of the EC compound proceeds and the third oxidation reaction of the EC compound does not proceed or a potential at which the first and third oxidation reactions proceed and the irreversible second oxidation reaction does not proceed.

Similarly, in the cathodic EC compound, a reversible reduction reaction (third reduction reaction) that is different from the first reduction reaction may occur at a potential between the potential at which the reversible first reduction reaction occurs and the potential at which the irreversible second reduction reaction occurs. Since the third reduction reaction is a reversible reaction, the potential VR1 may be a potential at which the first reduction reaction of the EC compound proceeds and the third reduction reaction of the EC compound does not proceed or a potential at which the first and third reduction reactions proceed and the irreversible second reduction reaction does not proceed.

The EC layer 103 preferably contains an oxidizable substance when the EC compound that changes into a residual colored body as a result of charge imbalance is an anodic EC compound or a reducible substance when the EC compound that changes into a residual colored body as a result of charge imbalance is a cathodic EC compound. When both the anodic EC compound and the cathodic EC compound change into residual colored bodies, the EC layer 103 preferably contains an oxidizable substance and a reducible substance.

The oxidizable substance or the reducible substance is contained in the EC layer 103 while dissolved or dispersed in an electrolyte or immobilized on an immobilization carrier. The degree of charge rebalance that can be performed by using the oxidizable substance or the reducible substance is proportional to the amount of the oxidizable substance or reducible substance present in the system. Therefore, the oxidizable substance or the reducible substance is preferably contained in the EC layer 103 through dissolution or dispersion. In the case where the oxidizable substance or the reducible substance is immobilized on an immobilization carrier, a functional group or the like capable of bonding the immobilization carrier to the oxidizable substance or the reducible substance needs to be introduced, which restricts the molecular structure of compounds that can be used as the oxidizable substance or the reducible substance. In the case where the oxidizable substance or the reducible substance is contained in an electrolyte through dissolution or dispersion, a process for immobilizing the oxidizable substance or the reducible substance is not required, which simplifies the production process of the EC element 100.

More preferably, the oxidizable substance or the reducible substance is dissolved in an electrolyte and can be freely moved in the electrolyte of the EC layer 103 so as to be able to reach the first electrode 101 or the second electrode 102.

When the oxidizable substance or the reducible substance can be freely moved in the electrolyte, an immobilization carrier for immobilizing the oxidizable substance or the reducible substance is not required, which contributes to downsizing of the EC element 100. In the case where the oxidizable substance or the reducible substance is immobilized, the amount of the oxidizable substance or the reducible substance that can be immobilized may be limited by, for example, the surface area of the immobilization carrier. In the case where the oxidizable substance or the reducible substance is dissolved in an electrolyte, there are limitations in terms of solubility or the like. However, the limitation of the amount of the oxidizable substance or the reducible substance contained in the EC layer 103 is smaller than that in the case of the immobilization. Therefore, a larger amount of oxidizable substance or reducible substance can be present in the system by dissolving the oxidizable substance or the reducible substance in an electrolyte.

Configuration of Driving Unit

The configuration of the driving unit 510 will be described with reference to FIG. 5. FIG. 5 schematically illustrates an example of the configuration of the driving unit 510. The driving unit 510 is a unit configured to control the transmittance of the EC element 100 by pulse width modulation and includes a driving power supply 501, a resistor switch 502, a controller 503, and an acquisition unit 504. The driving unit 510 is configured to maintain the transmittance of the EC element 100 without changing the peak value of a pulse voltage waveform and control the transmittance of the EC element 100 by changing the ratio (duty ratio) of the duration of voltage applied relative to a single period of the pulse voltage waveform. When the voltage applied to the EC element 100 by the driving unit 510 is changed, the potential changes. Thus, the state of an oxidation-reduction reaction of each compound in the EC layer 103 can be changed.

(1) Driving Power Supply

The driving power supply 501 is configured to apply a voltage required to cause an electrochemical reaction in the EC layer 103 to the EC element 100. When the EC layer 103 of the EC element 100 contains a plurality of EC compounds, the absorption spectrum sometimes changes because of the difference in oxidation-reduction potential between the EC compounds or the difference in molar absorption coefficient between the EC compounds. The start of voltage application or the holding of voltage applied in the driving power supply 501 is conducted in response to signals from the controller 503. In this embodiment, a constant voltage is applied while the light transmittance of the EC element 100 is controlled.

(2) Resistor Switch

The resistor switch 502 is configured to interchangeably connect, in series, a resistor R1 or a resistor R2 having higher resistance than the resistor R1 in a closed circuit including the driving power supply 501 and the EC element 100. The resistance of the resistor R1 is preferably at least smaller than the highest impedance in the closed circuit of the element, preferably $10\Omega$ or less. The resistance of the resistor R2 is preferably larger than the highest impedance in the closed circuit of the element, preferably 1 M$\Omega$ or more. The resistor R2 may be air. In this case, the closed circuit is an open circuit in a strict sense. However, this circuit can be considered to be a closed circuit when air is regarded as the resistor R2.

(3) Controller

The controller 503 is configured to transmit switching signals to the resistor switch 502 to control switching of the resistor R1 and the resistor R2. When the resistor R1 is connected, a coloring reaction occurs in the EC element. When the resistor R2 is connected, a coloring reaction does not occur in the EC element. While the resistor R2 is connected, the EC material undergoes self-decoloration. This self-decoloration phenomenon occurs because of, for example, the instability of radical species of EC materials generated through the coloring reaction, the diffusion of the radical species into a counter electrode having a different potential, and the collision of the radical species of an anode material and the radical species of a cathode material in a solution.

The absorbance is maintained when the coloring amount and the self-decoloration amount are in balance. When the organic EC element is driven at a constant voltage from the driving power supply 501 without changing the duty ratio, the change in absorbance is saturated via a transient state and the saturated absorbance is maintained. To decrease the absorbance, it is sufficient that the duty ratio is set to a duty ratio smaller than the immediately previous duty ratio. To increase the absorbance, it is sufficient that the duty ratio is set to a duty ratio larger than the immediately previous duty ratio. Herein, when one period of control signals is long, an increase or decrease in absorbance may be visually observed. Therefore, one period is preferably 100 milliseconds or less and more preferably 10 milliseconds or less.

The driving method for the EC element 100 is not limited to the method in which the transmittance is controlled by the duty ratio. For example, a method in which the peak value of voltage is changed, a method in which an erasing voltage is applied while the resistor R2 is connected, or a method in which a short-circuit is caused while the resistor R1 is connected can be appropriately employed.

(4) Acquisition Unit

The acquisition unit 504 is configured to acquire the information on charge balance in the EC element 100. The controller 503 controls a voltage applied to the EC element 100 by the driving power supply 501 on the basis of the information acquired in the acquisition unit 504. The information on charge balance in the acquisition unit 504 is acquired by using a detection unit configured to detect the charge balance of the EC layer 103 or an input unit with which a user inputs information. The details of the method for detecting charge balance in the acquisition unit 504 will be described later.

The positions at which the constituent members of the driving unit 510 are disposed are not particularly limited. For example, when the EC element 100 is used for a window member, a part or the entirety of the configuration of the driving unit 510 may be disposed on a window frame or the like. Furthermore, the constituent members of the driving unit 510 may be shared with the constituent members of a device including an EC element. For example, when the EC element 100 is used for an imaging apparatus, the control unit of an imaging apparatus may have a function of the controller 503. Such a configuration can contribute to downsizing of an apparatus. In the case where the constituent members of the EC device 500 are arranged in an integrated manner, even when the EC element is replaced with another one, operations on which the characteristics specific to the EC elements are reflected can be achieved.

Reaction in EC Layer

Hereafter, the oxidation-reduction reaction in the EC layer 103 will be described. Herein, the reactions of an anodic EC compound and an oxidizable substance will be described. The following description is common to a cathodic EC compound and a reducible substance in the opposite polarity. Therefore, the case of the cathodic EC compound may also be described together with the expression "or" in the parentheses.

(1) Reaction for Coloration and Decoloration

When a voltage at which a first oxidation (or reduction) reaction that reversibly causes oxidation (or reduction) of an anodic (or cathodic) EC compound occurs is applied between the first electrode 101 and the second electrode 102, the EC compound is oxidized (or reduced) into a colored body. At this time, if the oxidizable (or reducible) substance contained in the EC layer 103 is oxidized (or reduced) while a charge imbalance is not generated, a reaction that disturbs the charge balance may occur. This may cause a charge imbalance or may decrease the amount of the oxidizable (or reducible) substance that can be used for charge rebalance. To prevent the irreversible oxidation (or reduction) of the oxidizable (or reducible) substance when there is no intention of performing charge rebalance, the oxidation (or reduction) reaction of the oxidizable (or reducible) substance is preferably less likely to occur than the first oxidation (or reduction) reaction.

When the EC element 100 is caused to have a decolored state, the anodic (or cathodic) EC compound is reduced (or oxidized) and decoloration is achieved.

(2) Reaction for Charge Rebalance

If a charge imbalance is caused, a part of the anodic (or cathodic) EC compound is left in an oxidized (or reduced) state, that is, as a colored body even when the EC element 100 is subjected to decoloring driving, which causes residual coloring. When such a charge imbalance is caused, the EC element 100 according to this embodiment performs charge rebalance by using an irreversible oxidation (or reduction) reaction of the oxidizable (or reducible) substance. In the following description, in the case of a single EC material, an EC compound left as the same colored body as a typical colored body generated through the first reversible reaction is referred to as a "residual colored body".

Specifically, the oxidizable (or reducible) substance is irreversibly oxidized (or reduced) by changing the voltage applied between the first electrode 101 and the second electrode 102. At this time, a second oxidation (or reduction) reaction occurs through which a normal anodic (or cathodic) EC compound is irreversibly oxidized (or reduced). As a result, the amount of the EC compound that can be used for coloration of the EC element 100 is decreased. This may cause coloring failure and decoloring failure that is caused when the EC compound is irreversibly oxidized (or reduced) into a colored body. To prevent the irreversible oxidation (or reduction) of the EC compound, the oxidation (or reduction) reaction of the oxidizable (or reducible) substance is preferably more likely to occur than the second oxidation (or reduction) reaction.

In order to satisfy the conditions in which the oxidation (or reduction) reaction of the oxidizable (or reducible) substance is less likely to occur than the first oxidation (or reduction) reaction and is more likely to occur than the second oxidation (or reduction) reaction, it is sufficient that the oxidizable (or reducible) substance satisfies the above condition (i) (or condition (ii)).

If the oxidizable (or reducible) substance is irreversibly oxidized (or reduced) at one of the first electrode 101 and the second electrode 102, any of the reactions below occurs and a decolored body of the anodic (or cathodic) EC compound that is a residual colored body is regenerated. As a result, the residual coloring of the EC element 100 in a decolored state can be suppressed. The reactions are, for example, a reaction through which an anodic (or cathodic) EC compound left in a colored state at the other electrode is reduced (or oxidized) and a reaction through which a cathodic (or anodic) EC compound reduced (or oxidized) in the EC layer 103 is reacted with a residual colored body to reduce (or oxidize) the residual colored body.

The generation of the colored body as a result of oxidation (or reduction) of the oxidizable (or reducible) substance affects the absorption spectrum of the EC element 100 in a colored state and the transparency of the EC element 100 in a decolored state. Therefore, an oxidizable (or reducible) substance whose oxidant (or reductant) is not colored is preferably selected. That is, the oxidizable (or reducible) substance satisfies the above condition (D) (or condition (H)).

As described above, in the EC element 100, if the "anodic charge imbalance" in which the anodic EC compound changes into a residual colored body is caused, the oxidizable substance that satisfies the conditions (A) to (D) is irreversibly oxidized through supply of electrons to cause charge rebalance. In the EC element 100, if the "cathodic charge imbalance" in which the cathodic EC compound changes into a residual colored body is caused, the reducible substance that satisfies the conditions (E) to (H) is irreversibly reduced through reception of electrons to cause charge rebalance.

In the electrochemical oxidation-reduction reaction, the oxidation-reduction potential of the oxidation-reduction substance such as the EC compound, the oxidizable substance, and the reducible substance is not necessarily a single value, but may have a range. Therefore, even if the oxidizable (or reducible) substance that satisfies the condition (i) (or (ii)) is used, the oxidizable (or reducible) substance may also be oxidized (or reduced) when the EC compound is reversibly oxidized (or reduced). Furthermore, the EC compound may also be irreversibly oxidized (or reduced) when the oxidizable (or reducible) substance is oxidized (or reduced).

To prevent such a phenomenon, the oxidation-reduction potential of the EC compound is desirably differentiated from the oxidation-reduction potential of the oxidizable substance or the reducible substance. For example, the potential difference between the potential VO1 (or VR1) at which the oxidizable (or reducible) substance is oxidized (or reduced) and the potential VA1 (or VC1) at which the first oxidation (or reduction) reaction of the anodic (or cathodic) EC compound occurs is 100 mV or more. The potential difference between the potential VO1 (or VR1) and the potential VA1 (or VC1) is preferably 200 mV or more. The potential difference between the potential VO1 (or VR1) and the potential VA2 (or VC2) at which the second oxidation (or reduction) reaction of the anodic (or cathodic) EC compound occurs is preferably 100 mV or more and more preferably 200 mV or more.

Method for Driving EC Element

A driving method for the EC device 500 will be described. As described above, when the EC element 100 is caused to have a colored state, a first voltage V11 is applied between the first electrode 101 and the second electrode 102. The first potential V21 obtained when the first voltage V11 is applied is a potential at which the first oxidation-reduction reaction through which the EC compound changes into a colored body proceeds and the irreversible oxidation reaction of the oxidizable substance or the irreversible reduction reaction of the reducible substance does not proceed.

The acquisition unit 504 appropriately acquires information on charge balance in the EC element 100. The controller 503 changes the driving voltage applied by the driving power supply 501 from the first voltage V11 for the first potential V21 to a second voltage V12 for a second potential V22 on the basis of the information from the acquisition unit 504. Specifically, the controller 503 changes the potential by controlling the driving power supply 501 when a charge imbalance is judged to be generated from the detection result of the detection unit serving as the acquisition unit 504.

The generation of a charge imbalance may be judged by referring to the transmittance in a decolored state or the transmittance in a colored state. A transmittance in a state in which the element is driven at the maximum transmittance is preferably referred to as the transmittance in a decolored state. A transmittance in a state in which the element is driven at the minimum transmittance is preferably referred to as the transmittance in a colored state.

The driving power supply 501 applies a second voltage V12 to the EC element 100 such that the irreversible oxidation or reduction reaction of the oxidizable substance or the reducible substance proceeds. As a result, the oxidation-reduction reaction for the above-described charge rebalance proceeds. The second potential V22 is a potential at which the irreversible oxidation or reduction reaction of the oxidizable substance or the reducible substance occurs and the irreversible second oxidation-reduction reaction of the EC compound does not occur. After the charge rebalance is performed, the controller 503 changes the voltage to the first voltage V11.

In this embodiment, the timing at which the charge rebalance is performed is not particularly limited. Preferably, information on the charge balance is acquired from the EC element 100 in a decolored state and charge rebalance is appropriately performed on the basis of the information. This is because the EC compound in a colored state that is left even after a sufficient time has passed from the decoloring driving of the EC element 100 is believed to be basically generated by charge imbalance.

Therefore, for example, a potential at which the oxidizable or reducible substance reacts is applied for a particular time during decoloring driving and thus the residual colored body of the EC compound is decolored by charge rebalance.

The potential difference between the potential applied at this time and the potential during decoloring driving is set such that the constituent units of the EC element 100 are not adversely affected by, for example, the deterioration reaction of the EC compound and electrolyte contained in the EC layer 103. Specifically, the potential difference is a potential difference at which the oxidation reaction of the oxidizable substance or the reduction reaction of the reducible substance proceeds and the irreversible reaction of the EC compound contained in the EC element 100 does not proceed. Herein, the absolute value of a voltage applied when charge rebalance is performed is advantageously increased because the electrode reaction required for charge rebalance is facilitated.

On the other hand, when the absolute value of a voltage applied when charge rebalance is performed is advantageously decreased because an adverse effect on the EC compound and an increase in power consumption can be suppressed. The range of a voltage applied when charge rebalance is performed is preferably appropriately set in accordance with, for example, the characteristics and operating environment of elements.

In this specification, the driving method conducted when charge rebalance is performed is described from the viewpoint of voltage control in which an applied voltage is controlled. However, the driving method according to the present invention is not limited to the voltage control. A current control (charge amount control) method may also be employed as long as the first potential V21 and second potential V22 of the EC element 100 are within a particular potential range.

When the current control is employed, charge rebalance can be performed by, for example, the following method. The EC element 100 is caused to have a normal fully-colored state, and a current that flows between the first electrode 101 and the second electrode 102 is measured. Then, the current between the first electrode 101 and the second electrode 102 is controlled so that a current larger than the current flows. As a result, the potential difference between the first electrode 101 and the second electrode 102 reaches a potential difference which exceeds a voltage that causes the first oxidation (or reduction) reaction through which the anodic (or cathodic) EC compound is reversibly oxidized (or reduced) and at which the oxidizable (or reducible) substance is oxidized (or reduced). Thus, charge rebalance proceeds. The current beyond the fully colored state varies depending on, for example, the concentration ratio of the EC compound and the oxidizable (or reducible) substance contained in the EC element. For example, the current may be in the range of 101% to 200% of the current in a fully colored state.

In other words, the voltage or current applied in an application step of voltage or current for charge rebalance is larger than the voltage or current applied when the electrochromic element is colored. That is, higher energy is provided to the electrochromic element during charge rebalance than during normal driving.

The voltage application time for charge rebalance varies depending on the applied voltage. In principle, the voltage application time for charge rebalance is preferably longer than the time for which an electric double layer is formed on an electrode surface and the faradaic current starts to flow and shorter than the time for which the charge balance exceeds its normal range and the charge imbalance of the opposite polarity is caused. The voltage application time varies depending on the voltage applied. The voltage application time is also dependent on, for example, the response speed of the EC element 100, but may be 1 ms or more and 10 s or less. It is also preferred that based on the charge balance of the EC element 100 after a voltage is applied for a short time, the next voltage application time and the application voltage be selected.

Preferably, the voltage is continuously applied for charge rebalance or is applied for charge rebalance in a particular pattern such as a pulse pattern. In particular, the voltage is preferably applied in a pulse pattern.

Alternatively, the information on the charge balance of the EC element 100 is acquired, and the polarity, magnitude, and the like of the voltage applied may be determined on the basis of the information. The method for acquiring the information on charge balance will be described below.

Method for Acquiring Information on Charge Balance

The method for acquiring the information on charge balance by the acquisition unit 504 will be described. The method for acquiring the information on the charge balance of the EC element 100 by the acquisition unit 504 is classified into, for example, a method for detecting the charge balance of the EC layer 103 by using the light absorption of the EC compound and a method for detecting the charge balance of the EC layer 103 by measuring the electrode potential.

(1) Detection Method that Uses Light Absorption

The method for detecting the charge balance by using the light absorption of the EC compound is a method for measuring the amount of light absorbed at an absorption wavelength that is characteristic to each of the anodic EC compound and cathodic EC compound contained in the EC layer 103. FIG. 1B illustrates an example of a structure of an EC element 100 including a unit configured to measure the amount of light absorbed.

As illustrated in FIG. 1B, the EC element 100 includes two light sources 150 and two detectors 151 configured to detect light that has been emitted from the two light sources 150 and has passed through the EC element 100. If a charge imbalance is caused, the amount of light absorbed in a decolored state increases or the ratio of the amounts of light absorbed in a colored state changes. Therefore, the charge balance can be detected from the amount of light absorbed.

Specifically, a change in the amount of light absorbed from the amount of light absorbed in an initial decolored state is determined. If the change in the amount of light absorbed exceeds the threshold, a charge imbalance is judged to be caused. The change in the amount of light absorbed may be, for example, a difference or a ratio between the amount of light absorbed in an initial decolored state and the measured amount of light absorbed.

The light sources 150 used are light sources that can emit light having an intensity required for detection of charge balance and that desirably do not affect the characteristics of the EC element 100 in use. Specifically, the light sources 150 emit light having an absorption wavelength characteristic to each of the anodic EC compound and the cathodic EC compound. The light sources 150 may be, for example, LEDs. The detectors 151 may be any detector as long as the detector has a sensitivity required for detection of charge balance and does not adversely affect the characteristics of the EC element 100 in use. A specific example of the detector is a light-receiving element such as a photodiode.

(2) Detection Method that Uses Electrode Potential

The method for detecting charge balance by measuring an electrode potential is, for example, a method in which the electrode potential of the first electrode 101 and/or the second electrode 102 is measured using a reference electrode or the like. Hereafter, this is more specifically described using, as an example, the case where the anodic EC compound changes into a residual colored body. The following description also applies to the case where the coloring of the cathodic EC compound is left in the opposite polarity. Therefore, the case where the cathodic EC compound changes into a residual colored body may also be described together with the expression "or" in the parentheses.

When the anodic (or cathodic) EC compound changes into a residual colored body, the cathodic (or anodic) EC compound in the EC layer 103 is substantially completely reduced (or oxidized) and has a decolored state. Therefore, the potential of the first electrode 101 and/or the second electrode 102 in a decolored state is believed to be determined by the ratio of the oxidant and reductant of the anodic (or cathodic) EC compound.

A material used as the EC compound preferably exhibits highly reversible oxidation-reduction characteristics. If a material having no high reversibility is used, the responsivity and durability of EC elements deteriorate and the power consumption increases. Therefore, if the residual colored body is present, the potential of the first electrode 101 and/or the second electrode 102 shifts from the standard electrode potential of the anodic (or cathodic) EC compound in proportion to the natural logarithm of the activity ratio of the oxidant and the reductant in accordance with the Nernst equation. The activity ratio of the oxidant and the reductant can be approximately replaced with the concentration ratio of the oxidant and the reductant. By using this, the charge balance can be detected.

The case where an anodic EC material and a cathodic EC compound are dissolved in an electrolyte and can freely move will be described as an example. In this case, the charge balance can be judged by whether the potential of the first electrode 101 and/or the second electrode 102 is closer to the oxidation-reduction potential of either of the anodic EC compound or the cathodic EC compound. For example, when the electrode potential is closer to the oxidation-reduction potential of the cathodic EC compound, the charge balance can be judged to shift to the case where the cathodic EC compound is subjected to residual coloring. That is, an anodic (or cathodic) charge imbalance can be judged to be caused.

Furthermore, the case where the anodic EC compound and the cathodic EC compound are immobilized on the first electrode 101 and the second electrode 102, respectively, will be described. By measuring the direction and degree of the shift of the potential of the first electrode 101 or the second electrode 102 from the oxidation-reduction potential of the EC compound immobilized on the corresponding electrode, the charge balance can be judged.

For example, when the oxidant of the anodic EC compound changes into a residual colored body, the potential of an electrode on which the cathodic EC compound has been immobilized is a sufficiently positive potential compared with the oxidation-reduction potential, and almost all the cathodic EC compound is believed to be an oxidant (decolored body). The potential of an electrode on which the anodic EC compound has been immobilized is close to the oxidation-reduction potential of the anodic EC compound, and the oxidant and reductant of the anodic EC compound are believed to coexist.

(3) Another Method

The acquisition unit 504 may be an input unit with which a user inputs information obtained by judging the presence or absence of a charge imbalance through visual inspection of coloring of the EC element 100. For example, when a user judges the presence of a charge imbalance, the user inputs the information of the charge imbalance using the input unit and the controller 503 changes the voltage of the driving power supply 501 on the basis of the information. In this case, the input unit may be, for example, a specific button placed at a user-operable position.

Absorption Spectrum

Figure 3A:
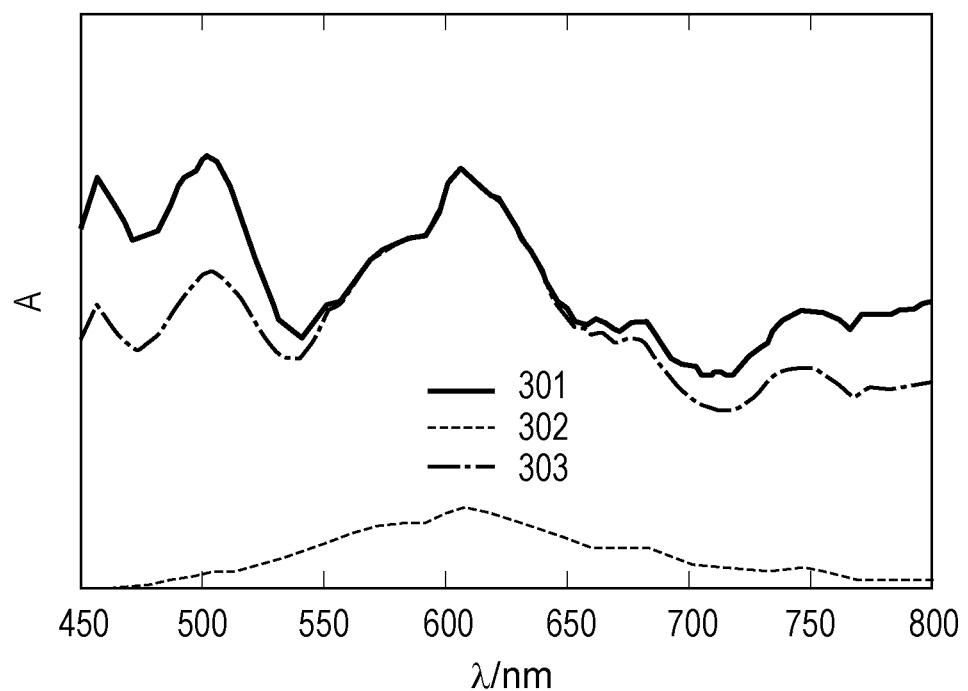
FIG. 3A illustrates absorption spectra of an electrochromic device according to the first embodiment.
Figure 3B:
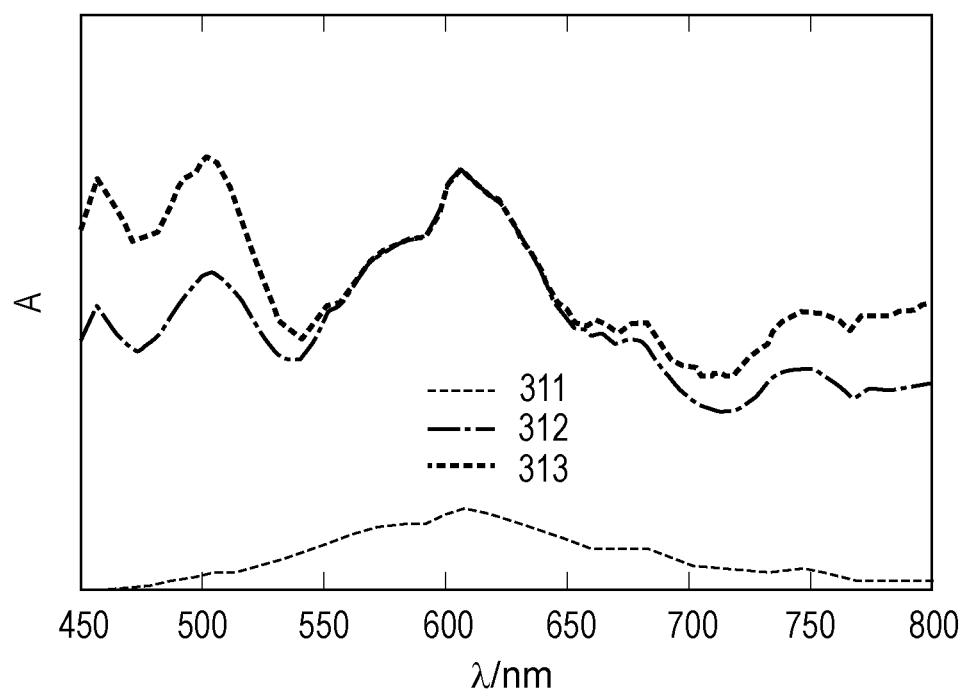
FIG. 3B illustrates absorption spectra of the electrochromic device according to the first embodiment.

FIG. 3B illustrates an absorption spectrum of the EC element 100 in a colored state or a decolored state. For comparison, the absorption spectrum of an EC element including an EC layer not containing an oxidizable substance or a reducible substance is illustrated in FIG. 3A. In FIGS. 3A and 3B, the absorption spectra of complementary EC elements are determined by calculation. In the calculation, the anodic EC compound is assumed to be a compound having absorption peaks at 455 nm and 500 nm, and the cathodic EC compound is assumed to be a compound having an absorption peak at 605 nm.

When the charge balance is normal, the absorption spectrum of the EC element 100 in a colored state is the same as the absorption spectrum (spectrum 301 in FIG. 3A) of an EC element including an EC layer not containing an oxidizable substance or a reducible substance in a colored state.

When a charge imbalance is caused and a colored body of the cathodic EC compound is left, the absorption spectrum of each EC element in a decolored state turns into a spectrum 302 in FIG. 3A and a spectrum 311 in FIG. 3B. When a charge imbalance is caused, an absorption peak derived from a colored body of the cathodic EC compound is observed at 605 nm even after the EC element is subjected to decoloring driving.

When a colored body of the cathodic EC compound is left, the absorption spectrum of each EC element in a colored state turns into a spectrum 303 in FIG. 3A and a spectrum 312 in FIG. 3B. If a cathodic charge imbalance is caused as in the spectra 303 and 312, the absorption at 455 nm and 500 nm derived from an anodic EC compound is relatively decreased compared with the spectrum 301 in a normal state.

When charge rebalance is performed on the EC element 100 according to this embodiment by using an irreversible oxidation reaction of an oxidizable substance or an irreversible reduction reaction of a reducible substance, the absorption spectrum of the EC element 100 in a colored state turns into a spectrum 313. The spectrum 313 is substantially the same as the absorption spectrum 301 that is obtained when the charge balance is normal. This shows that the change in the absorption spectrum shape in a colored state is suppressed by performing charge rebalance using an oxidizable substance or a reducible substance.

Relationship Between Oxidation-Reduction Potentials of EC Compound and Oxidizable Substance/Reducible Substance To determine whether the oxidizable substance satisfies the conditions (B) and (C) or the reducible substance satisfies the conditions (F) and (G), a method for investigating the relationship between the oxidation-reduction potentials of compounds contained in the EC layer 103 will be described below. The method for investigating the relationship between the oxidation-reduction potentials of an EC compound and an oxidizable substance or a reducible substance is not limited to the following method, and various methods can be employed.

Hereafter, the case where the relationship between the oxidation-reduction potentials of an anodic EC compound and an oxidizable substance is investigated will be described as an example. The following description is common to a cathodic EC compound and a reducible substance in the opposite polarity. Therefore, the case of the cathodic EC compound may also be described together with the expression "or" in the parentheses.

(1) Method that Uses Direct Electron Transfer Reaction

In a method that uses a direct electron transfer reaction, a first oxidant (or first reductant) obtained through the first oxidation (or reduction) reaction of an anodic (or cathodic) EC compound is brought into direct contact with the corresponding oxidizable (or reducible) substance. Herein, the first oxidant (or first reductant) is a colored body.

The method that uses a direct electron transfer reaction will be more specifically described. To a solution containing an electrolyte in which a first oxidant (or reductant) of the anodic (or cathodic) EC compound is dissolved, the corresponding oxidizable (or reducible) substance is added. As a result, if the colored state of the anodic (or cathodic) EC compound is maintained, it can be confirmed that the oxidation (or reduction) reaction of an oxidizable (or reducible) substance is less likely to occur than the first oxidation (or reduction) reaction of the anodic (or cathodic) EC compound. That is, it can be confirmed that the oxidizable (or reducible) substance satisfies the condition (B) (or (F)).

(2) Method for Measuring Oxidation-Reduction Potential

The method described below is a method in which the electrode reaction potentials of an EC compound and an oxidizable substance or a reducible substance are measured and compared with each other. The oxidation-reduction potential can be determined by electrochemical measurement. For example, the oxidation-reduction potential can be measured by performing cyclic voltammogram measurement (hereafter referred to as "CV measurement") on each of the EC compound and the oxidizable substance or the reducible substance.

As a result of this measurement, if the potential at which the oxidation (or reduction) reaction of the oxidizable (or reducible) substance occurs is on the positive (or negative) side relative to the half-wave potential of the first oxidation (or reduction) reaction of the anodic (or cathodic) EC compound, it can be confirmed that the condition (B) (or (F)) is satisfied.

Furthermore, if the potential at which the oxidation (or reduction) reaction of the oxidizable (or reducible) substance occurs is on the negative (or positive) side relative to the potential at which a current resulting from the second oxidation (or reduction) reaction of the anodic (or cathodic) EC compound rises, the condition (C) (or (G)) is satisfied.

In the CV measurement, at least a working electrode and a counter electrode are provided. The working electrode is preferably an electrode made of the same material as that of the electrodes of the EC element 100. For example, when the electrodes 101 and 102 of the EC element 100 are made of ITO, the working electrode is an electrode containing ITO. The counter electrode is preferably, for example, a platinum electrode having a sufficient area. The solvent or supporting electrolyte used in the CV measurement is preferably a solvent or a supporting electrolyte contained in the EC layer 103. The sweep rate in a voltammogram is preferably set to, for example, 20 mVs$^{-1}$ or more and 200 mVs$^{-1}$ or less.

By the above method, it can be confirmed whether the oxidizable substance satisfies the condition (i) or the reducible substance satisfies the condition (ii). That is, it can be confirmed whether the oxidizable substance satisfies the conditions (B) and (C) or the reducible substance satisfies the conditions (F) and (G).

As described above, the EC element 100 according to this embodiment includes the EC layer 103 containing at least one of the oxidizable substance that satisfies the conditions (A) to (D) and the reducible substance that satisfies the conditions (E) to (H), and thus charge rebalance can be performed. This decreases the amount of a residual colored body, which can suppress the residual coloring of the EC element in a decolored state and the change in absorption spectrum in a colored state.

In the EC element 100 according to this embodiment, if the residual coloring in a decolored state is not caused, only a voltage that causes the first oxidation-reduction reaction of the EC compound to proceed may be applied and the potential may be increased when the charge imbalance is corrected. This can suppress an increase in power consumption.

In the EC element containing a redox buffer in PTL 1, the residual coloring in a decolored state can be suppressed. However, charge rebalance cannot be performed by the method in PTL 1 as described above. Thus, the ratio of a colored body of the anodic EC compound and a colored body of the cathodic EC compound in a colored state changes, which may change the absorption spectrum.

In contrast, the EC element 100 according to this embodiment can be subjected to charge rebalance, and thus the change in absorption spectrum shape in a colored state can be suppressed.

Since the redox buffer is more easily oxidized and reduced than the EC compound contained in the EC element, the power consumption for coloring driving of the EC element increases and also the response speed may decrease. In contrast, in the EC device 500 according to this embodiment, the oxidizable substance is oxidized or the reducible substance is reduced only when charge rebalance is performed. Thus, an increase in power consumption and a decrease in response speed can be suppressed compared with the related art.

For the method for performing charge rebalance on a complementary EC element, a method in which the EC compound contained in the EC layer is irreversibly decomposed by applying an excessive voltage to the EC layer is also considered to be employed in addition to the method that uses an irreversible reaction of an oxidizable substance or a reducible substance as in this embodiment.

However, if such a method is employed, the EC compound used for coloring of the EC element is irreversibly decomposed, which may decrease the coloring concentration of the EC element. For the degree of the residual coloring due to charge imbalance, the decrease in the coloring concentration due to decomposition of the EC compound is likely to be minor in the initial state. However, the repeated irreversible decomposition of the EC compound decreases the concentration of the EC compound. Consequently, coloring failure due to the decrease in coloring concentration may become non-negligible.

Figure 4:
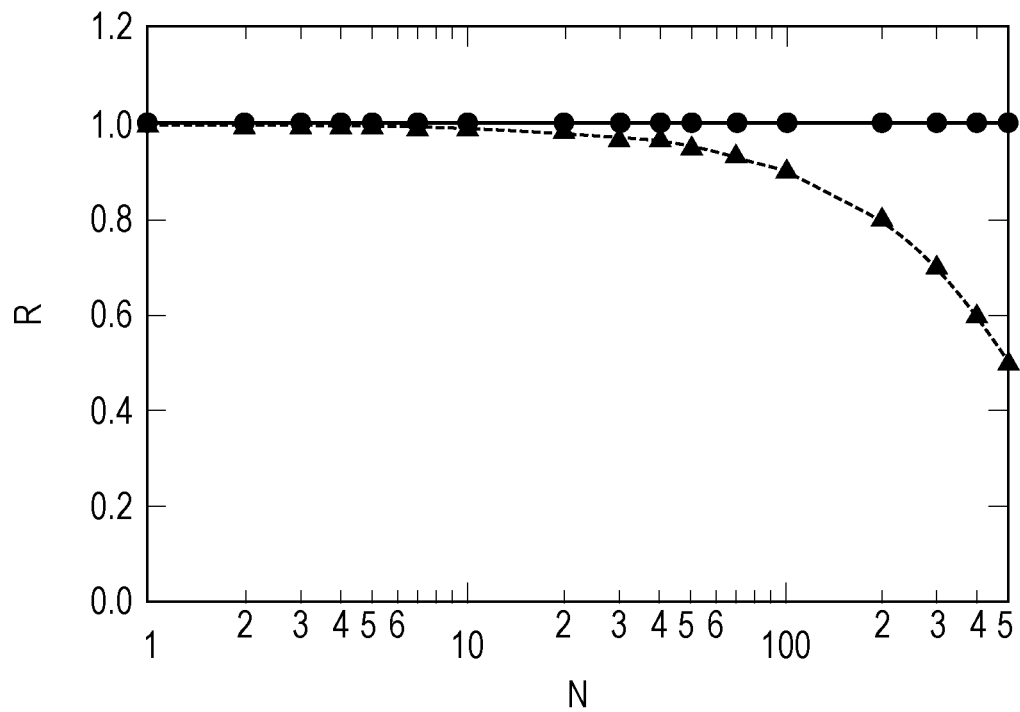
FIG. 4 illustrates the relationship between the coloring concentration of an EC layer in a colored state and the number of times of charge rebalance of an EC compound.

FIG. 4 illustrates the relationship between the coloring concentration of the EC layer in a colored state and the number of times of charge rebalance of the EC compound. In FIG. 4, the vertical axis indicates the coloring concentration (R) of the EC layer when the initial value of the coloring concentration is assumed to be 1 and the horizontal axis indicates the number (N) of times of charge rebalance performed. Circles are plotted in the case where charge rebalance is performed by the method according to this embodiment and triangles are plotted in the case where charge rebalance is performed by the irreversible decomposition of the EC compound. The amount of an EC compound subjected to a single charge rebalance is 0.1% relative to the whole amount of the EC compound. As is clear from FIG. 4, the coloring concentration of the EC layer decreases with increasing the number of times of charge rebalance in the case where the EC compound is irreversibly decomposed whereas the coloring concentration is substantially constant in the case where the method according to this embodiment is employed.

In the case where a decomposition product obtained by irreversibly decomposing the EC compound exhibits absorption and changes into a colored body, the charge imbalance can be eliminated, but residual coloring due to the decomposition product may occur.

Second Embodiment

Figure 7A:
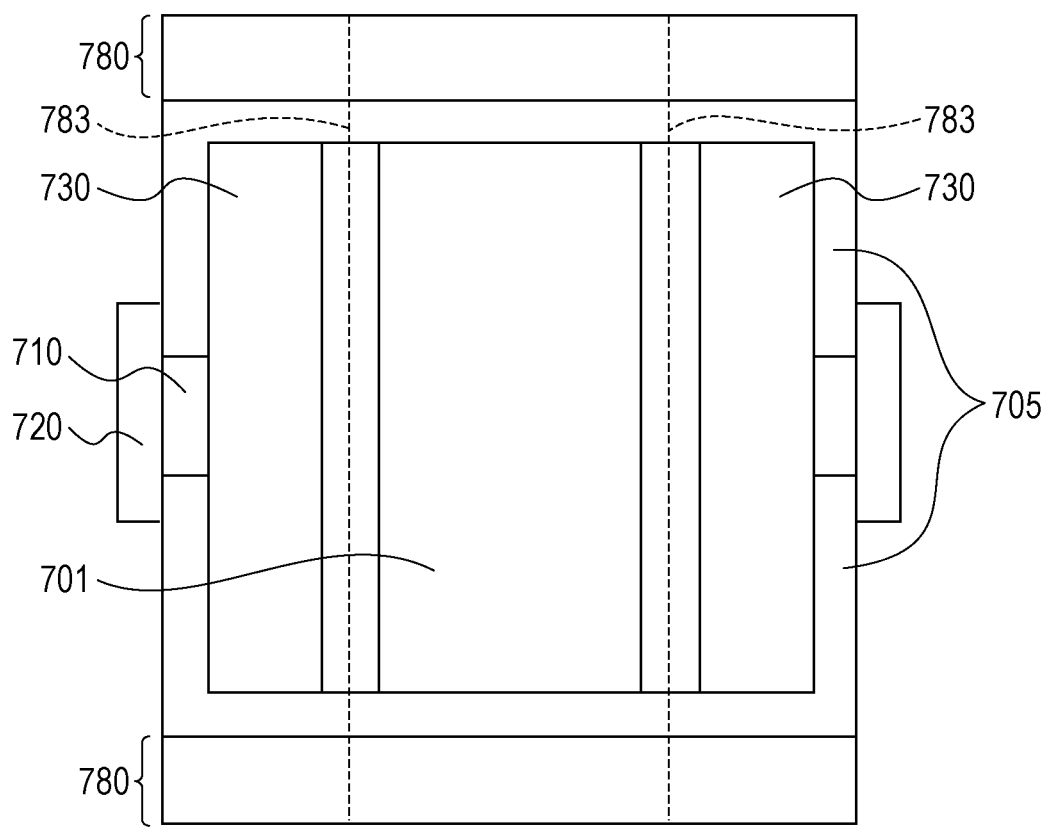
FIG. 7A schematically illustrates the structure of an electrochromic element according to a second embodiment.
Figure 7B:
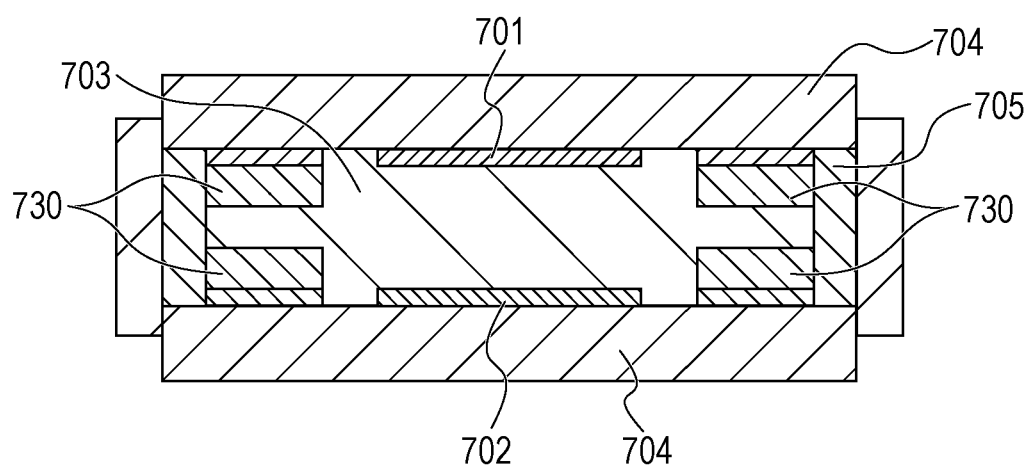
FIG. 7B schematically illustrates the structure of the electrochromic element according to the second embodiment.

An EC element 700 according to this embodiment will be described with reference to FIGS. 7A and 7B. The EC element 700 is an EC element including third electrodes 730. FIG. 7A is a top view illustrating the structure of the EC element 700 and FIG. 7B is a sectional view illustrating the structure of the EC element 700.

The EC element 700 includes a first electrode 701, a second electrode 702, an EC layer 703, substrates 704, a sealing member 705, and third electrodes 730. The first electrode 701 and the second electrode 702 are disposed between the pair of substrates 704 so as to face each other. The EC layer 703 is disposed between the first electrode 701 and the second electrode 702. The sealing member 705 is disposed between the pair of substrates 704, and the pair of substrates 704 and the sealing member 705 constitute a cell. An opening 710 is formed in the cell and sealed with a sealant 720. The first electrode 701, the second electrode 702, the EC layer 703, the substrates 704, and the sealing member 705 are the same as the corresponding members in the first embodiment, and thus the detailed description thereof is omitted.

The third electrodes 730 are electrodes for causing an irreversible oxidation reaction of an oxidizable substance or an irreversible reduction reaction of a reducible substance for charge rebalance. The irreversible reaction of the oxidizable substance or the reducible substance may contaminate the first electrode and the second electrode. Therefore, the third electrodes 730 may be optionally disposed to perform a reaction for charge rebalance. In this case, the oxidizable substance is irreversibly oxidized or the reducible substance is irreversibly reduced at the third electrodes 730. This can suppress the inhibition of an oxidation-reduction reaction of an EC compound and a decrease in the transparency of the EC layer due to the adsorption of the oxidized oxidizable substance or the reduced reducible substance onto the first electrode and the second electrode.

The material for the third electrodes 730 is not particularly limited, and may be the same as the material for the first electrode 101 or the second electrode 102 in the first embodiment. The third electrodes 730 may be optionally made of a material having a porous structure with a large effective area. A large effective area can decrease the projection area of the third electrodes 730, which can contribute to downsizing of the EC element 700.

The material that has a porous structure and can be used for the third electrodes 730 may be any one of a conductive oxide such as tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), niobium-doped titanium oxide (TNO), or titanium oxide, a porous carbon material, and a porous metal. Alternatively, for example, a film obtained by combining the foregoing materials may be used.

To achieve a large effective area, the porous structure is preferably a nanometer-scale fine structure from the viewpoint of production. The porous structure may have any shape, may be produced by any method, and may be a nano-structure such as a nano-particle film, a nanorod, a nanowire, or a nanotube each having communicating holes. In particular, a particle film having a large specific surface area per volume and easy to produce can be suitably used. Particles to form the particle film preferably have an average particle size of 300 nm or less, more preferably 50 nm or less.

In the case where the third electrodes 730 are disposed at positions outside the optical path of light that enters the EC element 100, the material is not limited to the above transparent conductive oxide, and may be a conductive electrode that scatters light, an opaque porous electric conductor, a carbon material, or a metal such as platinum or titanium.

The arrangement of the first electrode 701, the second electrode 702, and the third electrodes 730 will be described. The first electrode 701 and the second electrode 702 can be arranged in a generally known electrode arrangement of the EC element 700. In a typical example, as in this embodiment, the first electrode 701 and the second electrode 702 disposed on the substrates 704 face each other so as to have an interelectrode distance of about 1 µm to 500 µm.

In the case where the third electrodes 730 are made of a material having a low visible light transmittance, such as a metal or carbon material having a porous structure, the light transmittance in the EC layer 703 may be considerably decreased by the third electrodes 730. In the case where the third electrodes 730 are made of a material having a high transmittance, if there is a difference in refractive index between the third electrodes 730 and the electrolyte, the light transmittance in the EC layer 703 may be decreased through scattering and the like. Therefore, the third electrodes 730 are preferably disposed outside the optical path of light that passes through at least one of the first electrode 701 and the second electrode 702.

The phrase "outside the optical path" means outside the optical path of light for the EC element used as a light-absorbing element. The case where the EC element is used as a transmissive filter for an imaging apparatus will be described as an example. In this case, the third electrodes 730 are preferably disposed at positions outside the optical path of light that reaches a region used for imaging in the entire region of a light-receiving element (e.g., a CCD sensor or a CMOS sensor) of the imaging apparatus, the light being part of light that passes through the EC element. By disposing the third electrodes 730 outside the optical path, the flexibility of selection of a material for the third electrodes 730 can be improved. Furthermore, by performing a reaction for charge rebalance at the third electrodes 730, the influence of the irreversibly oxidized oxidizable substance or the irreversibly reduced reducible substance on the transparency of the EC element 700 can be decreased.

Third Embodiment

The EC element according to this embodiment is the same as that in the first embodiment, except that an oxidation-reduction substance that satisfies the following conditions (a) to (c) or (d) to (f) is further contained in the EC layer 103 according to the first embodiment.

As described above, the oxidizable substance is a substance that satisfies the conditions (A) to (D) and irreversibly causes an electrochemical oxidation reaction. The reducible substance is a substance that satisfies the conditions (E) to (H) and irreversibly causes an electrochemical reduction reaction. In addition, the EC layer 103 according to this embodiment contains a plurality of oxidation-reduction substances that electrochemically cause reversible oxidation-reduction reactions. The plurality of oxidation-reduction substances are constituted by at least one EC compound and an oxidation-reduction substance that satisfies the following conditions (a) to (c) or (d) to (f). The EC layer 103 may further contain one or more different EC compounds. The EC layer 103 may contain a plurality of oxidation-reduction substances that satisfy the conditions (a) to (c) or (d) to (f).

(a) The oxidation-reduction substance is reversibly oxidized.
(b) The reversible oxidation reaction is less likely to occur than the reversible oxidation reaction through which the anodic EC compound contained in the EC layer is caused to have a colored state.
(c) The reversible oxidation reaction is more likely to occur than the irreversible oxidation reaction of the anodic EC compound contained in the EC layer.
(d) The oxidation-reduction substance is reversibly reduced.
(e) The reversible reduction reaction is less likely to occur than the reversible reduction reaction through which the cathodic EC compound contained in the EC layer is caused to have a colored state.
(f) The reversible reduction reaction is more likely to occur than the irreversible reduction reaction of the cathodic EC compound contained in the EC layer.

The oxidation-reduction substance that satisfies the conditions (b) and (c) satisfies the condition (iii). The oxidation-reduction substance that satisfies the conditions (e) and (f) satisfies the condition (iv).

(iii) The potential VO2 at which the oxidation-reduction substance is reversibly oxidized is between the potential VA1 at which the anodic EC compound contained in the EC layer 103 is reversibly oxidized and the potential VA2 at which the anodic EC compound is irreversibly oxidized.
(iv) The potential VR2 at which the oxidation-reduction substance is reversibly reduced is between the potential VC1 at which the cathodic EC compound contained in the EC layer 103 is reversibly reduced and the potential VC2 at which the cathodic EC compound is irreversibly reduced.

The oxidation-reduction substance that satisfies the conditions (a) to (c) or (d) to (f) is preferably not colored when reversibly oxidized or reduced. Furthermore, the oxidation-reduction substance that satisfies the conditions (a) to (c) or (d) to (f) is preferably not electrochemically oxidized or reduced at a potential at which the EC compound starts to be oxidized or reduced into a colored state.

When the EC layer 103 contains the oxidizable substance and the oxidation-reduction substance that satisfies the conditions (a) to (c), the oxidation-reduction substance that satisfies the conditions (a) to (c) preferably has higher reactivity and is more easily oxidized than the oxidizable substance. That is, the potential at which the oxidation-reduction substance that satisfies the conditions (a) to (c) is reversibly oxidized from the initial state is preferably between the potential at which the first oxidation reaction of the anodic EC compound occurs and the potential at which the oxidizable substance is irreversibly oxidized.

When the EC layer 103 contains the reducible substance and the oxidation-reduction substance that satisfies the conditions (d) to (f), the oxidation-reduction substance that satisfies the conditions (d) to (f) preferably has higher reactivity and is more easily reduced than the reducible substance. That is, the potential at which the oxidation-reduction substance that satisfies the conditions (d) to (f) is reversibly reduced from the initial state is preferably between the potential at which the first reduction reaction of the cathodic EC compound occurs and the potential at which the reducible substance is irreversibly reduced.

The oxidation-reduction substance that satisfies the conditions (a) to (c) according to this embodiment satisfies the condition (iii). Therefore, when a large current temporarily flows through the EC element, the oxidation reaction of the oxidation-reduction substance that satisfies the conditions (a) to (c) more preferentially proceeds than the irreversible oxidation reaction (second oxidation reaction) of the EC compound through which the EC compound deteriorates. The oxidation-reduction substance that satisfies the conditions (d) to (f) according to this embodiment satisfies the condition (iv). Therefore, when a large current temporarily flows through the EC element, the reduction reaction of the oxidation-reduction substance that satisfies the conditions (d) to (f) more preferentially proceeds than the irreversible reduction reaction (second reduction reaction) of the EC compound through which the EC compound deteriorates. Thus, when the EC layer contains the oxidation-reduction substance that satisfies the conditions (a) to (c) or (d) to (f), the progress of the irreversible second oxidation or reduction reaction is suppressed, which can suppress the deterioration of the EC compound. This can suppress the generation of a charge imbalance in the EC element.

In the EC element according to this embodiment, even if a charge imbalance is caused, the residual coloring in a decolored state and a change in absorption spectrum in a colored state can be suppressed.

Fourth Embodiment

The EC element and EC device according to each of the above embodiments can be used for, for example, optical filters, lens units, imaging apparatuses, and window members.

An optical filter according to this embodiment includes the EC element according to each of the above embodiments and an active element connected to the EC element. The active element is an active element configured to drive the EC element and control the amount of light that passes through the EC element. Examples of the active element include transistors and MIM elements. The transistor may include an oxide semiconductor such as InGaZnO in an active region.

A lens unit according to this embodiment includes a plurality of lenses and an optical filter including the EC element according to each of the above embodiments. The optical filter may be disposed between the plurality of lenses or outside the lenses. The optical filter is preferably disposed on the optical axis of the lenses.

An imaging apparatus according to this embodiment includes the optical filter according to this embodiment, a light-receiving element configured to receive light having passed through the optical filter, and an imaging optical system configured to guide light to the light-receiving element. Examples of the imaging apparatus include cameras, video cameras, and cellular phones with a camera. The imaging apparatus may separately include a main body including the light-receiving element and a lens unit including the lenses.

The EC element according to each of the above embodiments can also be used for window members. A window member according to this embodiment includes a pair of substrates, an EC element disposed between the pair of substrates, and an active element connected to the EC element. The amount of light that passes through the pair of substrates can be controlled by the EC element. A window can be provided by combining the window member with a window frame or the like. The window member can be used for, for example, windows for automobiles, airplanes, and construction materials.

The details of the optical filter, lens unit, imaging apparatus, and window member including the EC element are described in Japanese Patent Laid-Open No. 2015-129111.

Hereafter, Examples will be described, but the present invention is not limited to Examples below.

Example 1

Synthesis of Reducible Substance 1

A compound represented by structural formula (1) below was synthesized as a reducible substance 1. The reducible substance 1 was synthesized with reference to the synthesis method in Japanese Patent Laid-Open No. 2007-171781. Specifically, 1,4-dibromobenzene and diethyl 3-bromopropylphosphonate, which were raw materials in the synthesis method of [Chem. 8] in Japanese Patent Laid-Open No. 2007-171781, were replaced with 1,2-dibromo-3,4,5,6-tetrafluorobenzene and methyl 4-(bromomethyl)benzoate, respectively. The hydrolysis process of a phosphate by reflux with hydrochloric acid was omitted.

$^1$H-NMR (acetonitrile) δ: 9.65 (4H, d), 8.05 (4H, d), 7.80 (4H, d), 7.45 (4H, d), 5.77 (4H, s), 3.89 (6H, s).

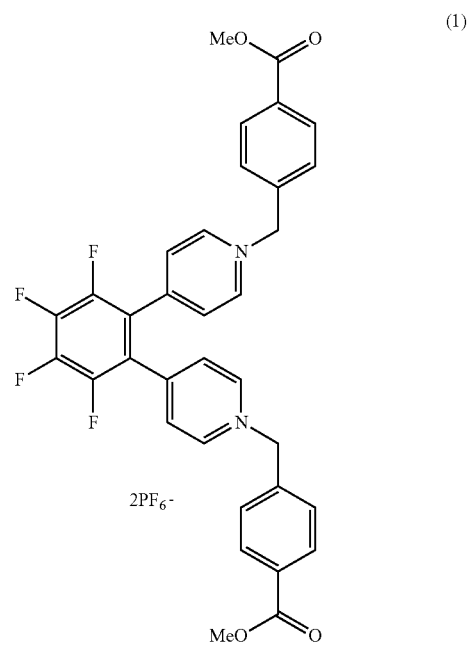

Example 2

Synthesis of Oxidizable Substance 1

A compound represented by structural formula (2) below was synthesized as an oxidizable substance 1.

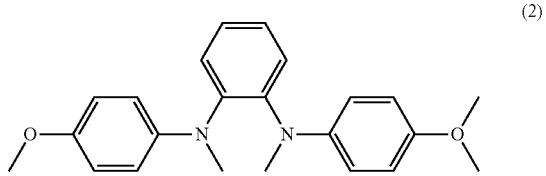

(2)

The oxidizable substance 1 was synthesized by the following method. First, 150 mg of palladium acetate and 1.68 mL of a 0.2 g/mL toluene solution of tri-tert-butyl phosphate were inserted into a reaction vessel and stirred for 30 minutes. Then, 3.91 g of 1,2-dibromobenzene, 5.0 g of N-methyl-p-anisidine, 4.79 g of sodium tert-butoxide, and 5 g of toluene were added thereto and a reaction was caused in a nitrogen atmosphere at 120° C. for 24 hours. Furthermore, 150 mg of palladium acetate and 1.68 mL of a toluene solution of tri-tert-butyl phosphate were added thereto to cause a reaction for 36 hours and then left to cool. The resulting suspension was added to water and ethyl acetate and washed to remove unnecessary products. Then, an aqueous layer was extracted with ethyl acetate, and the organic layers were combined, washed with water and a saline solution, dried, and concentrated to obtain a powder. The powder was subjected to column purification and preparative GPC to obtain an oxidizable substance 1.

Example 3

Synthesis of Oxidizable Substance 2

A compound represented by structural formula (3) below was synthesized as an oxidizable substance 2.

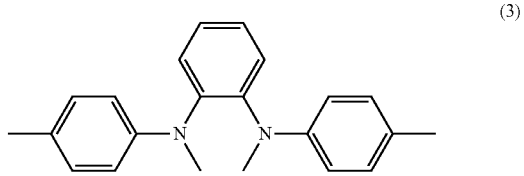

(3)

The oxidizable substance 2 was synthesized by the same synthesis method as that of the oxidizable substance 1, except that 6.42 g of N-methyl-p-toluidine was used instead of 5.0 g of N-methyl-p-anisidine in the synthesis of the oxidizable substance 1 in Example 2.

Example 4

Production of EC Element

The EC element 100 according to the first embodiment is produced by a method described below.

Two substrates 104 on which indium-doped tin oxide (ITO) films serving as a first electrode 101 and a second electrode 102 have been formed are provided. The substrates 104 are made of a transparent conductive glass. Then, a UV-curable adhesive (TB3035B, manufactured by Three-Bond) that contains spacer beads having a size of 100 μm and serves as a sealing member 105 is applied onto an outer periphery of each of the two substrates 104. Subsequently, the two substrates 104 are placed on top of each other such that the ITO films face each other, and irradiated with UV light to cure the adhesive. Thus, the two substrates 104 are bonded to each other to produce a cell. The produced cell has an opening 110.

An anodic EC compound, a cathodic EC compound, and an oxidizable substance 1 were dissolved in a solvent to prepare an electrolyte solution to be contained in the EC layer 103. In this example, the anodic EC compound is 5,10-dimethyl-5,10-dihydrophenazine (hereafter referred to as "DMDHP"), and the cathodic EC compound is heptyl-viologen trifluoromethanesulfonate (hereafter referred to as "HV"). The concentration of DMDHP and HV contained in the electrolyte solution is set to 50 mM, and the concentration of the oxidizable substance 1 is set to 5 mM. The prepared electrolyte solution is injected through the opening 110, and then the opening 110 is sealed with a sealant 120 using the UV-curable adhesive to produce an EC element 100.

In this example, a measurement unit configured to measure the amount of light absorbed is included as an acquisition unit 504. The detection unit in this example includes light sources 150 and detectors 151 configured to detect light that has been emitted from the light sources 150 and that has passed through the EC layer 103.

Specifically, two light sources 150 are partly disposed on an upper surface of one of the pair of substrates 104 of the EC element 100 so as to be in contact with the substrate 104. One irradiation unit is an LED that emits light having a wavelength of 460 nm and the other irradiation unit is an LED that emits light having a wavelength of 595 nm. The wavelengths of light emitted from the two light sources 150 correspond to absorption wavelengths of colored bodies of the anodic EC compound and the cathodic EC compound contained in the EC layer 103. Detectors 151 are disposed on a lower surface of a substrate that faces the substrate on which the two light sources 150 are disposed such that light emitted from the two light sources 150 enters the detectors 151. A photodiode is used as the detectors 151. By disposing the detectors 151 in this manner, the absorbance at an absorption wavelength of the colored body of each EC compound can be measured and the absorbance ratio can be acquired as information on charge balance.

Measurement of Oxidation-Reduction Potential

For the EC compound and the oxidizable substance 1 used in this example, the oxidation-reduction potential was measured to evaluate the reactivity of each compound. Hereafter, the specific method and the results will be described.

A solution was prepared by dissolving, in a concentration of 1 mM, DMDHP or HV serving as an EC compound or the oxidizable substance 1 in a 0.1 M propylene carbonate (hereafter referred to as "PC") solution of tetrabutylammonium hexafluorophosphate. Then, CV measurement was performed using ITO as a working electrode, platinum as a counter electrode, and Ag/Ag$^+$ (PF$_6$, PC) as a reference electrode.

As a result, the half-wave potential of the first oxidation reaction of DMDHP was −0.62 V and the potential of the irreversible oxidation reaction was 1.35 V. The half-wave potential of the first reduction reaction of HV was −1.20 V and the potential of the irreversible reduction reaction was −2.60 V. The potential at which the oxidizable substance 1 was irreversibly oxidized was −0.18 V.

This result showed that the oxidation reaction of the oxidizable substance 1 was less likely to occur than the first oxidation reaction of the anodic EC compound and was more likely to occur than the irreversible oxidation reaction of the anodic EC material. In other words, it was confirmed that the oxidizable substance 1 satisfied the conditions (B) and (C), that is, the condition (i).

Measurement of Absorption Spectrum During Oxidation

The absorption spectra of a first oxidant of DMDHP serving as an anodic EC compound used in this example and an oxidant of the oxidizable substance 1 were measured.

The absorption spectra were measured by the following method. The same solution as used in the measurement of an oxidation-reduction potential was prepared, and the absorption spectrum of a solution near the working electrode was measured while an oxidation potential of the EC compound or oxidizable substance 1 contained in the solution was applied. The voltage was applied using a platinum mesh as a working electrode, platinum as a counter electrode, and $Ag/Ag^+$ ($PF_6$, PC) as a reference electrode.

Figure 6:
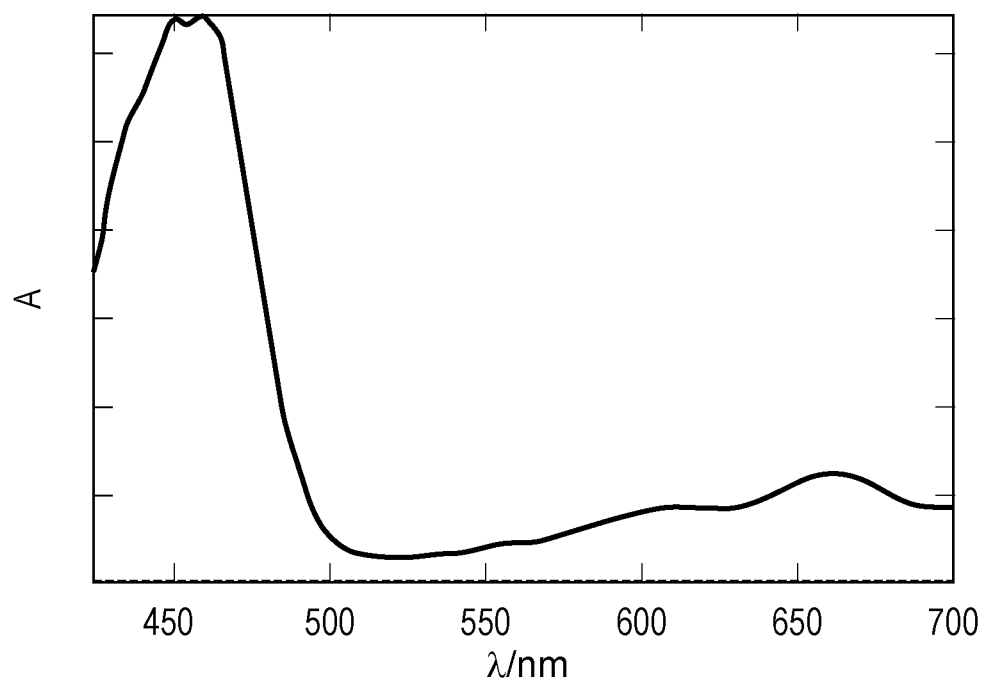
FIG. 6 illustrates absorption spectra of an electrochromic compound and an oxidizable substance in a colored state in Example 4.

FIG. 6 illustrates the measured absorption spectra. In FIG. 6, the absorption spectrum of DMDHP is indicated by a solid line and the absorption spectrum of the oxidizable substance 1 is indicated by a dotted line. The wavelength range used in the EC element of this example is 425 nm or more and 700 nm or less.

In this example, the absorbance measured when the oxidizable substance 1 is irreversibly oxidized is lower than the absorbance measured when the anodic EC compound is subjected to the first oxidation reaction, which is regarded as being substantially not colored.

Endurance Driving of EC Element

The durability of an EC element not subjected to charge rebalance with an oxidizable substance was evaluated. A voltage of 0.8 V was applied to the first electrode 101 and the second electrode 102 to provide a colored state, and the EC element was left in the colored state for one week. Subsequently, the first electrode 101 and the second electrode 102 were short-circuited to perform decoloring driving on the EC element 100. In the EC element 100 in a decolored state, the absorbance at each of 460 nm and 595 nm was measured and the change in absorbance from the absorbance in an initial state was determined. The change in absorbance was +0.10 at 460 nm and ±0.00 at 595 nm. This shows that a colored body of the anodic EC compound having an absorption peak at 455 nm is left and residual coloring (coloring failure) is caused.

Suppression of Coloring Failure

A driving method for the EC element in the case where residual coloring is suppressed by performing charge rebalance using an oxidizable substance will be described. In this example, when residual coloring is judged to be caused on the basis of the measurement of the measurement unit serving as an acquisition unit 504, the voltage applied to the first electrode 101 and the second electrode 102 is changed. Specifically, the EC device 500 is driven using the following sequence.

First, when the change in the absorbance at 460 nm or 595 nm from the absorbance in an initial state is judged to be larger than 0.005 on the basis of the measurement result of the measurement unit, the controller 503 changes the applied voltage of the driving power supply 501 to 1.5 V. A voltage of 1.5 V is applied for 10 ms. Then, when the change in the absorbance at 460 nm is larger than 0.005, a voltage of 1.5 V is applied again for 10 ms and the absorbance at 460 nm is measured. When the change in the absorbance at 460 nm is 0.005 or smaller or the change in the absorbance at 595 nm is 0.005 or larger, the voltage application is finished.

As a result, in the EC element 100 of this example, the change in the absorbance at 460 nm reached 0.005 or smaller about 2 minutes after the start of driving, and the voltage application was finished. Consequently, the residual coloring caused when a colored body of the anodic EC compound was left was decreased to ½0 or less the residual coloring without charge rebalance. In the EC element 100 immediately after the charge rebalance was performed by the above driving method, it was visually confirmed that the residual coloring was uniformly suppressed in the EC layer 103 to a substantially colorless state.

On the other hand, if the same procedure is performed on the EC element including an EC layer not containing the oxidizable substance 1, the coloring failure is left.

According to the EC element in this example, the residual coloring in a decolored state and the change in absorption spectrum in a colored state, which are caused by generation of a charge imbalance, can be suppressed.

Example 5

Production of EC Element

The EC element 700 according to the second embodiment is produced by a method described below.

First, two substrates 704 on which a fluorine-doped tin oxide (FTO) film has been formed are provided. The substrates 704 are made of a transparent conductive glass (TEC15, manufactured by Nippon Sheet Glass Co., Ltd.). Then, FTO films at positions along dotted lines 783 are removed with a diamond tool. Thus, each of the FTO films is divided into an FTO film that is positioned at the center of the substrates 704 and is to serve as a first electrode 701 or a second electrode 702 and FTO films that are positioned in regions of third electrodes 730 which are electrically independent of the first electrode 701 or the second electrode 702.

Subsequently, 12 g of antimony-doped tin oxide nanoparticles (manufactured by ISHIHARA SANGYO KAISHA, Ltd.), 2 mL of concentrated nitric acid, and 200 mL of water were mixed with each other, stirred at 80° C. for 8 hours, and then vacuum-dried for one day to obtain a cake of tin oxide nanoparticles. Then, 20 mL of water, 1.2 g of polyethylene glycol, and 0.4 g of hydroxypropyl cellulose were added to 4 g of the cake, and the resulting mixture was stirred for 15 days to prepare a slurry. The prepared slurry was applied onto the FTO films in regions where the third electrodes 730 were to be formed and fired at 500° C. for 30 minutes to obtain antimony-doped tin oxide nanoparticle films (hereafter may be referred to as "nanoparticle films") serving as the third electrodes 730. The specific surface area of the formed nanoparticle films was 450 cm²/g.

A sealing member 705 was bonded to the two substrates 704 on which the third electrodes 730 were formed using a UV-curable adhesive (TB3035B, manufactured by Three-Bond) that contained spacer beads having a size of 100 μm. Herein, the two substrates 704 are placed on top of each other such that the first electrode 701 and the second electrode 702 face each other, the third electrodes 730 face each other, and electrode lead portions 780 are exposed. The sealing member 705 partly has an opening 710. The adhesive is cured through irradiation with UV light.

An electrolyte solution to be contained in an EC layer 703 is prepared. The electrolyte solution in this example contains a cathodic EC compound, an anodic oxidation-reduction substance, and a reducible substance 1. The electrolyte solution is prepared by dissolving HV serving as the cathodic EC compound, ferrocene serving as the anodic oxidation-reduction substance, and the reducible substance 1 in a solvent. The concentration of ferrocene and HV contained in the electrolyte solution is set to 50 mM, and the concentration of the reducible substance 1 is set to 5 mM.

The prepared electrolyte solution is injected through the opening 710, and then the opening 710 is sealed with a sealant 720 using the UV-curable adhesive to produce an EC element 700.

In this example, a measurement unit configured to measure light absorption to detect the charge balance is provided as an acquisition unit 504. The measurement unit is the same as that in Example 4, except that light having a wavelength of 595 nm is radiated and detected.

Measurement of Oxidation-Reduction Potential

For the EC compound and the reducible substance 1 used in this example, the oxidation-reduction potential is measured to evaluate the reactivity of each compound. The method for measuring an oxidation-reduction potential is the same as that in Example 4. As a result, the half-wave potential of the first reduction reaction of HV was −1.20 V and the potential of the irreversible reduction reaction was −2.60 V. The potential at which the reducible substance 1 was irreversibly reduced was −1.35 V.

This result showed that the irreversible reduction reaction of the reducible substance 1 was less likely to occur than the first reduction reaction of the cathodic EC compound and was more likely to occur than the irreversible reduction reaction of the cathodic EC material. In other words, it was confirmed that the reducible substance 1 satisfied the conditions (F) and (G), that is, the condition (ii).

Measurement of Absorption Spectrum During Reduction

The absorption spectra of a first reductant of HV serving as a cathodic EC compound and a reductant of the reducible substance 1 are measured. The absorption spectra are measured by the same method as that in Example 4, except that a solution containing HV or the reducible substance 1 dissolved therein is used and a potential at which HV or the reducible substance 1 is reduced is applied.

Figure 8:
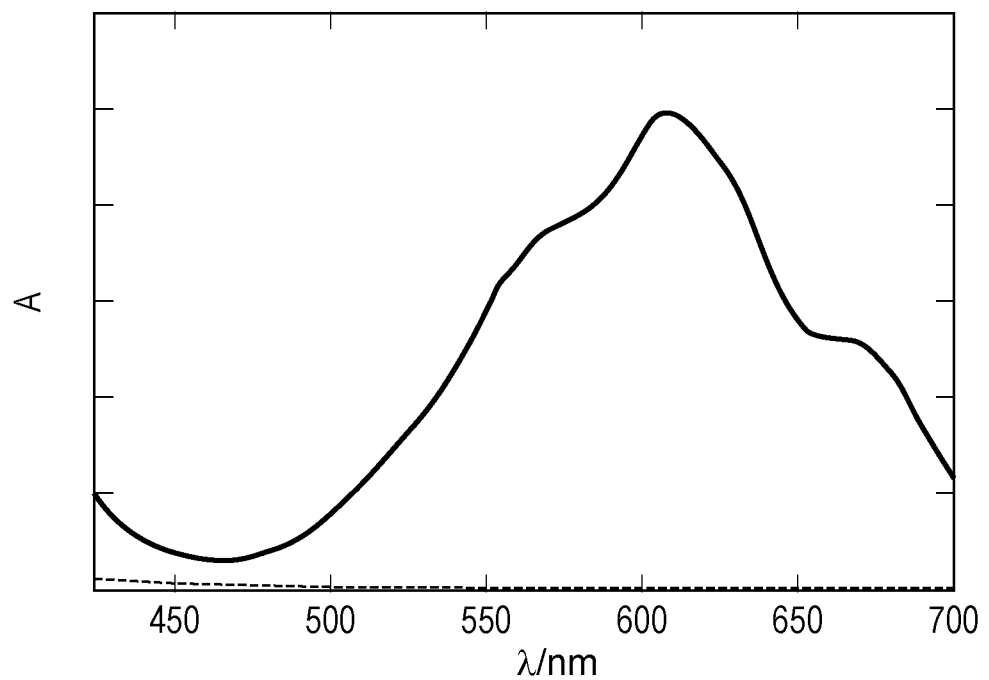
FIG. 8 illustrates absorption spectra of an electrochromic compound and an oxidizable substance in a colored state in Example 6.

FIG. 8 illustrates the measured absorption spectra. In FIG. 8, the absorption spectrum of HV is indicated by a solid line and the absorption spectrum of the reducible substance 1 is indicated by a dotted line. The wavelength range used in the EC element of this example is 425 nm or more and 700 nm or less.

In this example, the absorbance measured when the reducible substance 1 is irreversibly oxidized is lower than the absorbance measured when the cathodic EC compound is subjected to the first reduction reaction, which is regarded as being substantially not colored.

Endurance Driving of EC Element

The durability of the EC element 700 according to this example not subjected to charge rebalance with a reducible substance is evaluated. The method for evaluating the durability is the same as that in Example 4, except that the voltage applied to the first electrode 701 and the second electrode 702 to provide a colored state of the EC element is changed to 1.0 V. In the EC element in a decolored state, the absorbance at 595 nm was measured and the change in absorbance from the absorbance in an initial state was determined. The change in absorbance was ±0.10. This showed that a colored body of the cathodic EC compound was left and residual coloring (coloring failure) was caused.

Suppression of Coloring Failure

A driving method for the EC element in the case where residual coloring is suppressed by performing charge rebalance using a reducible substance will be described. In this example, when residual coloring is judged to be caused on the basis of the measurement result of the detection unit, a voltage at which the reducible substance 1 is reduced is applied to the first electrode 701 and the second electrode 702 to suppress the residual coloring. Specifically, driving is performed using the following sequence.

First, when the change in the absorbance at 595 nm is judged to be larger than 0.005 on the basis of the detection result of the detection unit, the controller 503 changes the applied voltage of the driving power supply 501 to 1.4 V. A voltage of 1.4 V is applied for 10 ms. Then, when the change in the absorbance at 595 nm is larger than 0.005, a voltage of 1.4 V is applied again for 10 ms and the absorbance is measured by the measurement unit. When the change in the absorbance at 595 nm is 0.005 or smaller, the voltage application is finished.

As a result, in the EC element of this example, the change in the absorbance at 595 nm reached 0.005 or smaller about 5 minutes after the start of driving, and the voltage application was finished. Consequently, the coloring failure caused when a colored body of the cathodic EC compound was left was decreased to 1/20 or less the coloring failure without charge rebalance. In the EC element 700 immediately after the charge rebalance was performed by the above driving method, it was visually confirmed that the coloring failure was uniformly suppressed in the EC layer 703 to a substantially colorless state.

On the other hand, if the same driving for suppressing coloring failure is performed on the EC element including an EC layer not containing the reducible substance 1, the coloring failure is left.

According to the EC element in this example, the residual coloring in a decolored state and the change in absorption spectrum in a colored state, which are caused by generation of charge imbalance, can be suppressed.

Example 6

Production of EC Element

An EC element in this example has the same structure as that in Example 4, except that the electrolyte solution contained in the EC layer 103 of this example contains an anodic EC compound, a cathodic EC compound, an oxidizable substance 2, and a reducible substance 1. In this example, the anodic EC compound is DMDHP and the cathodic EC compound is HV. The concentration of DMDHP and HV contained in the electrolyte solution is set to 50 mM and the concentration of the oxidizable substance 2 and the reducible substance 1 is set to 5 mM.

Measurement of Oxidation-Reduction Potential

For the EC compound, the oxidizable substance, and the reducible substance used in this example, the oxidation-reduction potential is measured by the same method as that in Examples 4 and 5 to evaluate the reactivity. As a result, the potential at which the oxidizable substance 2 was irreversibly oxidized was −0.35 V and the potential at which the reducible substance 1 was irreversibly reduced was −1.35 V. The oxidation-reduction potentials of DMDHP and HV were the same as those in Examples above.

This result shows that the oxidation reaction of the oxidizable substance 2 is less likely to occur than the first oxidation reaction of the anodic EC compound (the potential at which oxidation proceeds is positive) and is more likely to occur than the irreversible second oxidation reaction of the anodic EC material. In other words, the oxidizable substance 2 satisfies the conditions (B) and (C), that is, the condition (i). The reduction reaction of the reducible substance 1 is less likely to occur than the first reduction reaction of the cathodic EC compound and is more likely to occur than the irreversible second reduction reaction of the cathodic EC material. In other words, the reducible substance 1 satisfies the conditions (F) and (G), that is, the condition (ii).

Measurement of Absorption Spectrum During Oxidation and Reduction

The absorption spectra of a reductant of the reducible substance 1 and an oxidant of the oxidizable substance 2 are measured. The absorption spectra are measured by the same method as that in Examples 4 and 5, except that a solution containing a reductant of the reducible substance 1 or the oxidizable substance 2 dissolved therein is used.

As a result, in the range of 425 nm or more and 700 nm or less, which is a wavelength range used in the EC element in this example, the absorbance of the reductant of the reducible substance 1 is lower than the absorbance measured when the cathodic EC compound is subjected to the first reduction reaction. In the range of 425 nm or more and 700 nm or less, which is a wavelength range used in the EC element in this example, the absorbance of the oxidant of the oxidizable substance 2 is lower than the absorbance measured when the anodic EC compound is subjected to the first oxidation reaction. Thus, even if the oxidizable substance 2 and the reducible substance 1 are irreversibly oxidized and reduced, they are regarded as being substantially not colored.

Endurance Driving of EC Element

The durability of the EC element according to this example not subjected to charge rebalance with an oxidizable substance and a reducible substance is evaluated by the same method as that in Examples 4 and 5. As a result, in the EC element left in a colored state for one week, the change in the absorbance was +0.10 at 460 nm and ±0.00 at 595 nm. This shows that a colored body of the anodic EC compound is left and residual coloring (coloring failure) is caused.

Suppression of Coloring Failure

In this example, charge rebalance is performed using an oxidizable substance and a reducible substance through the same sequence as that in Example 4 to suppress the coloring failure.

As a result, the change in the absorbance at 460 nm reached 0.005 or smaller about 2 minutes after the start of driving, and the voltage application was finished. In the EC element after the voltage application was finished, the residual coloring caused when a colored body of the anodic EC compound was left was decreased to ¹⁄₂₀ or less the residual coloring without charge rebalance. In the EC element immediately after the charge rebalance was performed by the above driving method, it was visually confirmed that the residual coloring was uniformly suppressed in the EC layer to a substantially colorless state.

According to the EC element in this example, the residual coloring in a decolored state and the change in absorption spectrum in a colored state, which are caused by generation of charge imbalance, can be suppressed.

Preferred embodiments of the present invention have been described, but the present invention is not limited to these embodiments and various modifications and changes can be made without departing from the spirit of the present invention.

For example, in the above embodiments, the information on charge balance is acquired using, as the acquisition unit 504, a measurement unit configured to measure the amount of light absorbed or the potential. However, the acquisition unit 504 is not necessarily included.

Example 7

The production of an EC element, the measurement of an oxidation-reduction potential, the measurement of an absorption spectrum during oxidation, and the endurance driving of the EC element are performed by the same methods as those in Example 4.

Suppression of Coloring Failure

A driving method for the EC element in the case where residual coloring is suppressed by performing charge rebalance using an oxidizable substance will be described. In this example, when residual coloring is judged to be caused on the basis of the measurement of a measurement unit serving as the acquisition unit 504, a current that flows through the first electrode 101 and the second electrode 102 is controlled. Specifically, the EC device 500 is driven using the following sequence.

First, when the change in the absorbance at 460 nm or 595 nm from the absorbance in an initial state is judged to be larger than 0.005 on the basis of the measurement result of the measurement unit, the EC element is driven so as to have a normal fully-colored state. Furthermore, the controller 503 changes the driving current to 1.1 times the driving current in a normal fully-colored state and the driving current is applied for 10 ms. After decoloration, when the change in the absorbance at 460 nm is larger than 0.005, a current that is 1.1 times the current in a normal fully-colored state is applied again for 10 ms by the same method. After decoration is performed again, the absorbance at 460 nm is measured. When the change in the absorbance at 460 nm reaches 0.005 or smaller or the change in the absorbance at 595 nm reaches 0.005 or larger, the current control is finished.

As a result, in the EC element 100 in this example, the change in the absorbance at 460 nm reached 0.005 or smaller, and the residual coloring caused when a colored body of the anodic EC compound was left was decreased to ¹⁄₂₀ or less the residual coloring without charge rebalance. In the EC element 100 immediately after the charge rebalance was performed by the above driving method, it was visually confirmed that the residual coloring was uniformly suppressed in the EC layer 103 to a substantially colorless state.

On the other hand, if the same procedure is performed on the EC element including an EC layer not containing the oxidizable substance 1, the coloring failure is left.

According to the EC element in this example, the residual coloring in a decolored state and the change in absorption spectrum in a colored state, which are caused by generation of charge imbalance, can be suppressed.

The present disclosure can provide an electrochromic device in which the residual coloring in a decolored state and the change in absorption spectrum in a colored state are suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electrochromic device comprising:
an electrochromic element including:
a first electrode,
a second electrode, and
an electrochromic layer disposed between the first electrode and the second electrode; and
a controller for the electrochromic element,
wherein the electrochromic layer contains an anodic electrochromic compound and an oxidizable substance, the oxidizable substance is a substance which substantially does not undergo a color change due to oxidation and whose oxidant is not reduced,
an oxidation reaction of the oxidizable substance is less likely to occur than a reversible oxidation reaction of the anodic electrochromic compound and is more likely to occur than an irreversible oxidation reaction of the anodic electrochromic compound, and
the controller is configured to control oxidation of the oxidizable substance based on a charge balance of the electrochromic element.

2. The electrochromic device according to claim 1, wherein the electrochromic layer further contains a cathodic electrochromic compound and a reducible substance,
the reducible substance is a substance which substantially does not undergo a color change due to reduction and whose reductant is not oxidized, and
a reduction reaction of the reducible substance is less likely to occur than a reversible reduction reaction of the cathodic electrochromic compound and is more likely to occur than an irreversible reduction reaction of the cathodic electrochromic compound.

3. The electrochromic device according to claim 1, wherein the electrochromic layer further contains an oxidation-reduction substance that is reversibly oxidized, and
an oxidation reaction of the oxidation-reduction substance is more likely to occur than a reversible oxidation reaction of the anodic electrochromic compound and is less likely to occur than an irreversible oxidation reaction of the anodic electrochromic compound.

4. The electrochromic device according to claim 1, comprising a third electrode disposed at a position different from positions of the first electrode and the second electrode.

5. The electrochromic device according to claim 1, comprising an acquisition unit configured to acquire information on a charge balance of the electrochromic element,
wherein the controller is configured to change a voltage applied to the electrochromic element based on the information of the acquisition unit.

6. The electrochromic device according to claim 5, wherein the acquisition unit is a measurement unit configured to measure an amount of light absorbed in the electrochromic layer.

7. The electrochromic device according to claim 5, wherein when a charge imbalance is judged to be caused based on the information on a charge balance, the controller changes a potential from a first potential to a second potential by changing the voltage applied to the electrochromic element.

8. The electrochromic device according to claim 7, wherein the first potential is a potential at which the anodic electrochromic compound is reversibly oxidized and the oxidizable substance is not irreversibly oxidized or a potential at which a cathodic electrochromic compound is reversibly reduced and a reducible substance is not irreversibly reduced.

9. The electrochromic device according to claim 7, wherein the second potential is a potential at which an irreversible oxidation reaction of the oxidizable substance occurs and an irreversible oxidation reaction of the anodic electrochromic compound does not occur or a potential at which an irreversible reduction reaction of a reducible substance occurs and an irreversible reduction reaction of a cathodic electrochromic compound does not occur.

10. An optical filter comprising:
the electrochromic device according to claim 1; and
an active element that is connected to the electrochromic element and is configured to drive the electrochromic element.

11. A lens unit comprising:
the optical filter according to claim 10; and
an imaging optical system including a plurality of lenses.

12. An imaging apparatus comprising:
an imaging optical system including a plurality of lenses;
the optical filter according to claim 10; and
a light-receiving element configured to receive light that has passed through the optical filter.

13. A window member comprising:
a pair of substrates;
the electrochromic device according to claim 1, the electrochromic device being disposed between the pair of substrates; and
an active element that is connected to the electrochromic device and is configured to drive the electrochromic device to control an amount of light that passes through the pair of substrates.

14. An electrochromic device comprising:
an electrochromic element including:
a first electrode,
a second electrode, and
an electrochromic layer disposed between the first electrode and the second electrode; and
a controller for the electrochromic element,
wherein the electrochromic layer contains a cathodic electrochromic compound and a reducible substance,
the reducible substance is a substance which substantially does not undergo a color change due to reduction and whose reductant is not oxidized,
a reduction reaction of the reducible substance is less likely to occur than a reversible reduction reaction of the cathodic electrochromic compound and is more likely to occur than an irreversible reduction reaction of the cathodic electrochromic compound, and
the controller is configured to control reduction of the reducible substance based on a charge balance of the electrochromic element.

15. The electrochromic device according to claim 14, wherein the electrochromic layer further contains an oxidation-reduction substance that is reversibly reduced, and
a reversible reduction reaction of the oxidation-reduction substance is more likely to occur than a reversible reduction reaction of the cathodic electrochromic compound and is less likely to occur than an irreversible reduction reaction of the cathodic electrochromic compound.

16. The electrochromic device according to claim 14, comprising an acquisition unit configured to acquire information on a charge balance of the electrochromic element,
wherein the controller is configured to change a voltage applied to the electrochromic element based on the information of the acquisition unit.

17. The electrochromic device according to claim 16, wherein the acquisition unit is a measurement unit configured to measure an amount of light absorbed in the electrochromic layer.

18. An optical filter comprising:
the electrochromic device according to claim 14; and
an active element that is connected to the electrochromic element and is configured to drive the electrochromic element.

* * * * *